United States Patent

Tanaka et al.

[11] Patent Number: 6,075,091
[45] Date of Patent: *Jun. 13, 2000

[54] COMPOSITION OF POLYAMIDE AND ACID OR ANHYDRIDE-GRAFTED ETHYLENE/C6-C20 α-OLEFIN COPOLYMER

[75] Inventors: Yasuo Tanaka; Youji Hayakawa, both of Ichihara, Japan

[73] Assignee: Mitsui Chemicals Inc., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,682

[22] Filed: Jul. 11, 1996

[30] Foreign Application Priority Data

Jul. 13, 1995 [JP] Japan .................................. 7-177465

[51] Int. Cl.⁷ .......................... C08L 51/06; C08L 77/06; C08L 77/02
[52] U.S. Cl. ............................................. 525/66; 524/606
[58] Field of Search ...................... 525/66, 248; 524/606

[56] References Cited

U.S. PATENT DOCUMENTS

| | | | |
|---|---|---|---|
| 4,174,358 | 11/1979 | Epstein | 525/183 |
| 4,346,194 | 8/1982 | Roura | 525/66 |
| 4,410,653 | 10/1983 | Kohan | 524/371 |
| 4,478,978 | 10/1984 | Roura | 525/66 |
| 4,945,129 | 7/1990 | Mason et al. | 525/66 |
| 4,990,640 | 2/1991 | Tsutsui et al. | 556/181 |
| 5,103,030 | 4/1992 | Rohrmann et al. | 556/12 |
| 5,155,080 | 10/1992 | Elder et al. | 502/152 |
| 5,221,712 | 6/1993 | Ohmae et al. | 525/66 |
| 5,225,500 | 7/1993 | Elder et al. | 526/126 |
| 5,243,001 | 9/1993 | Winter et al. | 526/127 |
| 5,321,106 | 6/1994 | LaPointe | 526/126 |
| 5,387,568 | 2/1995 | Ewen et al. | 502/104 |
| 5,405,904 | 4/1995 | Ikejiri et al. | 525/66 |
| 5,648,423 | 7/1997 | Kagami et al. | 525/183 |
| 5,703,180 | 12/1997 | Tsutsui et al. | 526/119 |

FOREIGN PATENT DOCUMENTS

| | | | |
|---|---|---|---|
| 2084017 | 5/1993 | Canada . | |
| 29566 | 6/1981 | European Pat. Off. | 525/66 |
| 320762 | 12/1988 | European Pat. Off. . | |
| 0315451 | 5/1989 | European Pat. Off. . | |
| 0397531 | 11/1990 | European Pat. Off. . | |
| 0485631 | 5/1992 | European Pat. Off. . | |
| 622419 | 11/1994 | European Pat. Off. | 525/66 |
| 0629631 | 12/1994 | European Pat. Off. . | |
| 0668323 | 8/1995 | European Pat. Off. . | |
| 549900 | 8/1996 | European Pat. Off. . | |
| 17-12546 | 7/1942 | Japan . | |
| 53-80014 | 7/1978 | Japan . | |
| 55-9662 | 1/1980 | Japan | 525/66 |
| 55-44108 | 11/1980 | Japan . | |
| 56-109247 | 8/1981 | Japan . | |
| 56-157451 | 12/1981 | Japan . | |
| 56-167751 | 12/1981 | Japan . | |
| 57-78453 | 5/1982 | Japan | 525/66 |
| 57-200448 | 12/1982 | Japan | 525/66 |
| 59-91148 | 5/1984 | Japan | 525/66 |
| 59-126462 | 7/1984 | Japan | 525/66 |
| 59-164359 | 9/1984 | Japan | 525/66 |
| 62-11766 | 1/1987 | Japan | 525/66 |
| 62-43456 | 2/1987 | Japan | 525/66 |
| 62-13379 | 3/1987 | Japan . | |
| 62-79260 | 4/1987 | Japan | 525/66 |
| 63-57668 | 3/1988 | Japan | 525/66 |
| 01501950 | 7/1989 | Japan . | |
| 1-502036 | 7/1989 | Japan . | |
| 2-78687 | 3/1990 | Japan . | |
| 3-179005 | 8/1991 | Japan . | |
| 3-179006 | 8/1991 | Japan . | |
| 3-207703 | 9/1991 | Japan . | |
| 3-207704 | 9/1991 | Japan . | |
| 4-268307 | 9/1992 | Japan . | |
| 9516750 | 6/1995 | WIPO . | |

*Primary Examiner*—Robert E. Sellers

[57] ABSTRACT

The polyamide resin composition of the invention comprises 100 parts by weight of a polyamide resin (A) and from 5–200 parts by weight of a graft-modified ethylene/α-olefin random copolymer (B) which is obtained by graft-modifying an ethylene/α-olefin random copolymer of ethylene and an α-olefin of 6 to 20 carbon atoms with an unsaturated carboxylic acid or its derivative and has a graft quantity of 0.01 to 10% by weight. The graft-modified ethylene/α-olefin random copolymer (B) is a graft-modified product of an ethylene/α-olefin random copolymer having an α-olefin content of from 6 to 25% by mole and an intrinsic viscosity of from 0.5 to 5.0 dl/g measured in decalin at 135° C.

17 Claims, No Drawings

6,075,091

COMPOSITION OF POLYAMIDE AND ACID OR ANHYDRIDE-GRAFTED ETHYLENE/C6-C20 α-OLEFIN COPOLYMER

FIELD OF THE INVENTION

The present invention relates to a polyamide resin composition, and more particularly to a polyamide resin composition having excellent moldability and capable of providing molded products of excellent flexibility, low-temperature impact resistance, resistance to water absorption and resistance to saline solutions.

BACKGROUND OF THE INVENTION

Because of excellent properties of polyamide resins, they are expected to be in great demand as engineering plastics. However, some properties of the polyamide resins, such as flexibility, low-temperature impact resistance, resistance to water absorption and resistance to saline solutions, are not always sufficient, and therefore various improvements of these properties have been studied. If the polyamide resins are improved in the flexibility and low-temperature impact resistance, they can be applied to wide uses of from sports goods such as ski boots and sports shoes to industrial parts such as automobile parts, oil tubes, flexible tubes and air hoses, and a great demand therefor can be expected.

For improving the flexibility and the water resistance such as resistance to water absorption or resistance to saline solutions of the polyamide resins, a method of adding ethylene/α,β-unsaturated monocarboxylic acid copolymer neutralized products (ionomer resins) to the polyamide resins is proposed in Japanese Patent Laid-Open Publications No. 80014/1978, No. 167751/1981, No. 109247/1981 and No. 157451/1981.

However, the polyamide resin compositions proposed in these publications exhibit poor improved effects in the impact resistance such as Izod impact strength, particularly impact resistance at low temperatures, though they can be improved in the water resistance such as resistance to water absorption and resistance to saline solutions.

For improving the impact resistance such as Izod impact strength of the polyamide resins, a method of adding ethylene/α-olefin copolymer grafted with α,β-unsaturated carboxylic acids to the polyamide resins is proposed in, for example, Japanese Patent Publications No. 12546/1967 and No. 44108/1980 and Japanese Patent Laid-Open Publication No. 9662/1980.

However, the polyamide resin compositions proposed in these publications show insufficient flexibility and impact resistance at low temperatures. In addition, these polyamide resin compositions have poor moldability depending on the molding process.

As other method to improve the flexibility of the polyamide resins, a method of adding an ethylene/propylene copolymer grafted with α,β-unsaturated carboxylic acid or an ethylene-1-butene copolymer grafted with said acid to the polyamide resin in the amount exceeding ⅔ of the amount of the polyamide resin and not more than 6 times by weight as much as the polyamide resins is proposed in, for example, Japanese Patent Publication No. 13379/1987. However, the polyamide resin composition proposed in this publication still shows insufficient impact resistance at low temperatures and poor moldability, though the flexibility is satisfactory.

Accordingly, development of a polyamide resin composition having excellent moldability and capable of providing molded products of excellent flexibility, low-temperature impact resistance, resistance to water absorption and resistance to saline solutions has been desired up to now.

OBJECT OF THE INVENTION

The present invention is intended to solve such problems associated with the prior art as described above, and it is an object of the invention to provide a polyamide resin composition having excellent moldability and capable of providing molded products of excellent flexibility, low-temperature impact resistance, resistance to water absorption and resistance to saline solutions.

SUMMARY OF THE INVENTION

A polyamide resin composition according to the invention is a polyamide resin composition comprising:

[I] 100 parts by weight of a polyamide resin (A), and

[II] 5 to 200 parts by weight of a graft-modified ethylene/α-olefin random copolymer (B) being obtained by graft-modifying an ethylene/α-olefin random copolymer of ethylene and an α-olefin of 6 to 20 carbon atoms with an unsaturated carboxylic acid or its derivative and having a graft quantity of 0.01 to 10% by weight, wherein the graft-modified ethylene/α-olefin random copolymer (B) is a graft-modified product of an ethylene/α-olefin random copolymer having the following properties:

(a) the content of the α-olefin of 6 to 20 carbon atoms is in the range of 6 to 25% by mol; and (b) the intrinsic viscosity ($\eta$), as measured in decalin at 135° C., is in the range of 0.5 to 5.0 dl/g.

The ethylene/α-olefin random copolymer before the graft modification is preferably an ethylene/α-olefin random copolymer obtained by copolymerizing ethylene and an α-olefin of 6 to 20 carbon atoms in the presence of a metallocene catalyst.

The ethylene/α-olefin random copolymer before the graft modification is preferably a linear or long-chain branched ethylene/α-olefin random copolymer having the properties described below.

The linear ethylene/α-olefin random copolymer has the following properties:

(a) the content of the α-olefin of 6 to 20 carbon atoms is in the range of 6 to 25% by mol;

(b) the intrinsic viscosity ($\eta$), as measured in decalin at 135° C., is in the range of 0.5 to 5.0 dl/g;

(c) the glass transition temperature (Tg) is not higher than −50° C.;

(d) the crystallinity, as measured by X-ray diffractometry, is less than 30%;

(e) the molecular weight distribution (Mw/Mn), as determined by GPC, is not more than 3.0;

(f) the B value, as determined by the $^{13}$C-NMR spectrum and the following equation, is in the range of 1.0 to 1.4, $$B = P_{OE}/(2P_O \cdot P_E)$$

wherein $P_E$ and $P_O$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences; and (g) the ratio g$\eta$ of the intrinsic viscosity ($\eta$) determined in the property (b) to the intrinsic viscosity ($\eta$)$_{blank}$ of a linear ethylene/propylene copolymer having the same weight-average molecular weight (measured by a light scattering method) as said ethylene/α-olefin random copolymer and having an ethylene content of 70% by mol, $(\eta)/(\eta)_{blank}$, is more than 0.95.

The long-chain branched ethylene/α-olefin random copolymer has the following properties:

(a) the content of the α-olefin of 6 to 20 carbon atoms is in the range of 6 to 25% by mol;

(b) the intrinsic viscosity (η), as measured in decalin at 135° C., is in the range of 0.5 to 5.0 dl/g;

(c) the glass transition temperature (Tg) is not higher than −50° C.;

(d) the crystallinity, as measured by X-ray diffractometry, is less than 30%;

(e) the molecular weight distribution (Mw/Mn), as determined by GPC, is not more than 3.0;

(f) the B value, as determined by the $^{13}$C-NMR spectrum and the above-mentioned equation, is in the range of 1.0 to 1.4; and (g) the ratio gη* of the intrinsic viscosity (η) determined in the property (b) to the intrinsic viscosity $(\eta)_{blank}$ of a linear ethylene/propylene copolymer having the same weight-average molecular weight (measured by a light scattering method) as said ethylene/α-olefin random copolymer and having an ethylene content of 70% by mol, $(\eta)/(\eta)_{blank}$, is in the range of 0.2 to 0.95.

The linear ethylene/α-olefin random copolymer having the above properties is preferably a copolymer obtained by random copolymerizing ethylene and an α-olefin of 6 to 20 carbon atoms in the presence of a metallocene catalyst containing a metallocene compound represented by the following formula [C-a] or [B-a]:

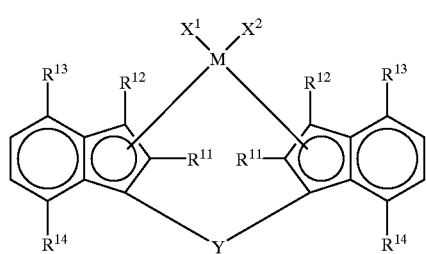

[C-a]

wherein M is a transition metal of Group IVB of the periodic table, $R^{11}$ and $R^{12}$ are each hydrogen, a halogen atom, a hydrocarbon group of 1 to 20 carbon atoms which may be substituted for halogen, a silicon-containing group, an oxygen-containing group, a sulfur-containing group, a nitrogen-containing group or a phosphorus-containing group, $R^{13}$ and $R^{14}$ are each an alkyl group of 1 to 20 carbon atoms, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —(R$^7$)—, —P(O) (R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms);

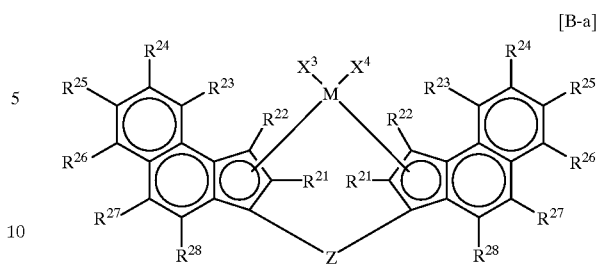

[B-a]

wherein M is a transition metal of Group IVB of the periodic table, $R^{21}$s may be the same as or different from each other and are each hydrogen, a halogen atom, an alkyl group of 1 to 10 carbon atoms which may be halogenated, an aryl group of 6 to 10 carbon atoms, —NR$_2$—, —SR, —OSiR$_3$, —SiR$_3$ or —PR$_2$ (R is a halogen atom, an alkyl group of 1 to 10 carbon atoms or any aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with atoms to which they are bonded, $X^3$ and $X^4$ may be the same as or different from each other and are each hydrogen, a halogen atom, an OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

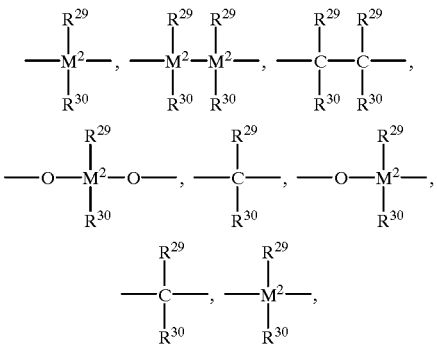

=BR$^{29}$, =AlR$^{29}$, —Ge—, —Sn—, —O—, —S—, =SO, =SO$_2$, =NR$^{29}$, =CO, =PR$^{29}$ or =P(O)R$^{29}$ (R$^{29}$ and R$^{30}$ may be the same as or different from each other and are each hydrogen, a halogen atom, an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or R$^{29}$ and R$^{30}$ may form a ring together with atoms to which they are bonded, and M$^2$ is silicon, germanium or tin).

The long-chain branched ethylene/α-olefin random copolymer having the above properties is preferably a copolymer obtained by random copolymerizing ethylene and an α-olefin of 6 to 20 carbon atoms in the presence of a metallocene catalyst containing a metallocene compound represented by the following formula [II]:

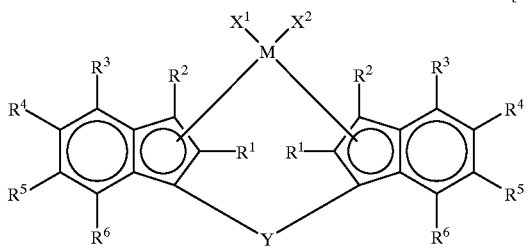

[II]

wherein M is a transition metal of Group IVB of the periodic table, $R^1$ is a hydrocarbon group of 1 to 6 carbon atoms, $R^2$, $R^4$, $R^5$ and $R^6$ may be the same as or different from each other and are each hydrogen, a halogen atom or a hydrocarbon group of 1 to 6 carbon atoms, $R^3$ is an aryl group of 6 to 16 carbon atoms, which may be substituted for a halogen atom, a hydrocarbon group of 1 to 20 carbon atoms or an organosilyl group, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O) (R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms).

DETAILED DESCRIPTION OF THE INVENTION

A polyamide resin composition according to the invention is described in detail hereinafter. The polyamide resin composition of the invention comprises a polyamide resin (A) and a specific graft-modified ethylene/α-olefin random copolymer (B) in a specific ratio.

Polyamide resin (A)

There is no specific limitation on the polyamide resin (A) used in the invention, and the term "polyamide resin" used herein means all the polymers which are composed of amino acid lactams or composed of diamines and carboxylic acids and have melt polymerizability and melt moldability.

Examples of the polyamide resin (A) used in the invention include the following resins:

(1) polycondensates of organic dicarboxylic acids having 4 to 12 carbon atoms and organic diamines having 2 to 13 carbon atoms, e.g., polyhexamethylene adipamide (nylon 6,6) which is a polycondensate of hexamethylenediamine and adipic acid, polyhexamethylene azelamide (nylon 6,9) which is a polycondensate of hexamethylenediamine and azelaic acid, polyhexamethylene sebacamide (nylon 6,10) which is a polycondensate of hexamethylenediamine and sebacic acid, polyhexamethylene dodecanoamide (nylon 6,12) which is a polycondensate of hexamethylenediamine and dodecanedioic acid, and polybis(4-aminocyclohexyl) methanedodecane which is a polycondensate of bis-p-aminocyclohexylmethane and dodecanedioic acid;

(2) polycondensates of co-amino acids, e.g., polyundecaneamide (nylon 11) which is a polycondensate of ε-aminoundecanoic acid; and (3) ring-opened polymers of lactams, e.g., polycaplamide (nylon 6) which is a ring-opened polymer of ε-aminocaprolactam, and polylauric lactam (nylon 12) which is a ring-opened polymer of ε-aminolaurolactam.

Of these, polyhexamethylene adipamide (nylon 6,6), polyhexamethylene azelamide (nylon 6,9) and polycaplamide (nylon 6) are preferably employed.

In the present invention, a polyamide resin prepared from adipic acid, isophthalic acid and hexamethylenediamine and a blend of two or more kinds of polyamide resins, e.g., a blend of nylon 6 and nylon 6,6, are also employable.

The polyamide resins (1) can be prepared by, for example, polycondensation of organic dicarboxylic acids having 4 to 12 carbon atoms and organic diamines having 2 to 13 carbon atoms in equimolar amounts. If desired, the organic dicarboxylic acid can be used in a larger amount than the organic diamine so that the amount of the carboxyl group becomes larger than that of the amino group in the resulting polyamide resin. To the contrary, the organic dicarboxylic acid can be used in a smaller amount than the organic diamine so that the amount of the amino group becomes larger than that of the carboxyl group in the resulting polyamide resin.

Examples of the organic dicarboxylic acids include adipic acid, pimelic acid, suberic acid, sebacic acid and dodecanedioic acid.

Examples of the organic diamines include hexamethylenediamine and octamethylenediamine.

The polyamide resins (1) can be also prepared from derivatives capable of producing carboxylic acids, such as esters and acid chlorides, and derivatives capable of producing amines, such as amine salts, in a manner similar to that described above.

The polyamide resins (2) can be prepared by, for example, polycondensation of ω-amino acids under heating in the presence of a small amount of water. In many cases, a viscosity stabilizer such as an acetic acid is added in a small amount.

The polyamide resins (3) can be prepared by, for example, ring-opening polymerizing lactams under heating in the presence of a small amount of water. In many cases, a viscosity stabilizer such as an acetic acid is added in a small amount.

Graft-modified ethylene/α-olefin random copolymer (B)

The graft-modified ethylene/α-olefin random copolymer (B) used in the invention is obtained by graft-modifying an ethylene/α-olefin random copolymer comprising ethylene and an α-olefin of 6 to 20 carbon atoms (sometimes referred to as "unmodified ethylene/α-olefin random copolymer" hereinafter) with a specific amount of an unsaturated carboxylic acid or its derivative.

Examples of the α-olefins of 6 to 20 carbon atoms include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These α-olefins can be used in combination.

The unmodified ethylene/α-olefin random copolymer has an α-olefin content of 6 to 25% by mol, preferably 8 to 22% by mol, more preferably 10 to 20% by mol. When the unmodified ethylene/α-olefin random copolymer having an α-olefin content within the above range is used, a graft-modified ethylene/α-olefin random copolymer (B) having good flexibility and ease of handling can be obtained. Further, when this graft-modified ethylene/α-olefin random copolymer (B) is used, a polyamide resin composition capable of providing molded products of excellent low-temperature impact resistance and flexibility can be obtained.

The unmodified ethylene/α-olefin random copolymer has an intrinsic viscosity (η), as measured in decalin at 135° C., of 0.5 to 5.0 dl/g, preferably 1.5 to 3.0 dl/g. The graft-modified ethylene/α-olefin random copolymer (B) obtained from the unmodified ethylene/α-olefin random copolymer having an intrinsic viscosity (η) within the above range exhibits good blending properties with the polyamide resin (A). Further, when this graft-modified ethylene/α-olefin random copolymer (B) is used, a polyamide resin composition having good moldability can be obtained.

The unmodified ethylene/α-olefin random copolymer having the above properties can be prepared by random copolymerizing ethylene and an α-olefin of 6 to 20 carbon atoms in the presence of a vanadium catalyst comprising a soluble vanadium compound and an alkylaluminum halide compound or a zirconium catalyst comprising a metallocene compound of zirconium and an organoaluminum oxy-compound, as described later.

Of various unmodified ethylene/α-olefin random copolymers having the above properties, preferably used are linear and long-chain branched ethylene/α-olefin random copolymers having the following properties.

The α-olefin content and the intrinsic viscosity of the linear ethylene/α-olefin random copolymer preferably used in the invention are described above.

The linear ethylene/α-olefin random copolymer further has a glass transition temperature (Tg), as determined by DSC (differential scanning calorimeter), of not higher than −50° C. When the graft-modified ethylene/α-olefin random copolymer (B) obtained from the unmodified linear ethylene/α-olefin random copolymer having a glass transition temperature (Tg) within the above range is used, a polyamide resin composition capable of providing molded products of excellent low-temperature impact resistance and low-temperature flexibility can be obtained.

The unmodified linear ethylene/α-olefin random copolymer has a melting point of not higher than 90° C.

The unmodified linear ethylene/α-olefin random copolymer has a crystallinity, as measured by X-ray diffractometry, of less than 30%, preferably not more than 20%. When the graft-modified ethylene/α-olefin random copolymer (B) obtained from the unmodified linear ethylene/α-olefin random copolymer having a crystallinity of less than 30% is used, a polyamide resin composition having good moldability can be obtained.

It is preferable that the unmodified linear ethylene/α-olefin random copolymer has a molecular weight distribution (Mw/Mn), as determined by GPC, of not more than 3.0, and has a parameter (B value), which indicates randomness of the monomer sequence distribution in the copolymer, of 1.0 to 1.4.

The B value of the unmodified linear ethylene/α-olefin copolymer is an index of the composition distribution of constituent units derived from each monomer in the sequences in the copolymer, and it can be calculated by the following equation:

$$B = P_{OE}/(2 P_O \cdot P_E)$$

wherein $P_E$ and $P_O$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences.

The values for $P_E$, $P_O$ and $P_{OE}$ can be determined in the following manner.

In a test tube having a diameter of 10 mm, about 200 mg of the unmodified ethylene/α-olefin copolymer is homogeneously dissolved in 1 ml of hexachlorobutadiene to give a sample, and a $^{13}$C-NMR spectrum of the sample was obtained by measuring under the following measuring conditions.

Measuring conditions

Measuring temperature: 120° C.

Measuring frequency: 20.05 MHz

Spectrum width: 1,500 Hz

Filter width: 1,500 Hz

Pulse repetition time: 4.2 sec

Pulse width: 7 μsec

Integrating times: 2,000 to 5,000

The $P_E$, $P_O$ and $P_{OE}$ values can be determined from the $^{13}$C-NMR spectrum thus obtained in accordance with the reports by G. J. Ray (Macromolecules, 10,773 (1977)), J. C. Randall (Macromolecules, 15,353 (1982)) and K. Kimura (Polymer, 25,4418 (1984)).

The B value calculated by the above equation becomes 2 when the both monomers are alternately distributed in the unmodified ethylene/α-olefin random copolymer, and it becomes 0 when the both monomers are completely separated and polymerized to form a complete block copolymer.

When the graft-modified ethylene/α-olefin random copolymer (B) obtained from the unmodified ethylene/α-olefin random copolymer having a B value within the above range is used, a polyamide resin composition capable of providing molded products of excellent low-temperature impact resistance can be obtained.

The linear ethylene/α-olefin random copolymer has a gη* value, as determined by the intrinsic viscosity (η) of said copolymer, of more than 0.95.

The gη* value is defined by the following equation:

$$g\eta^* = (\eta)/(\eta)_{blank}$$

wherein (η) is an intrinsic viscosity of the ethylene/α-olefin random copolymer measured as above, and $(\eta)_{blank}$ is an intrinsic viscosity of a linear ethylene/propylene copolymer which has the same weight-average molecular weight (measured by a light scattering method) as the ethylene/α-olefin random copolymer and has an ethylene content of 70% by mol.

From the linear ethylene/α-olefin random copolymer having such properties as mentioned above, a polyamide resin composition excellent in all of the mechanical properties, weathering resistance, ozone resistance, low-temperature resistance (low-temperature flexibility) and heat resistance and a molded product of the composition can be obtained.

The α-olefin content, intrinsic viscosity, glass transition temperature, crystallinity, molecular weight distribution and B value of the long-chain branched ethylene/α-olefin random copolymer preferably used in the invention are the same as those of the linear ethylene/α-olefin random copolymer described above.

The gη* value of the long-chain branched ethylene/α-olefin random copolymer is in the range of 0.2 to 0.95, preferably 0.4 to 0.9, more preferably 0.5 to 0.85. This gη* value can be determined in the aforementioned manner.

By the fact the gη* value of the ethylene/α-olefin random copolymer is not more than 0.95 is indicated that a long-chain branch is formed in the molecule.

The linear and long-chain branched ethylene/α-olefin random copolymers preferably used in the invention can be each prepared by random copolymerizing ethylene and an α-olefin of 6 to 20 carbon atoms in the presence of a metallocene catalyst containing the corresponding specific metallocene compound.

Preparation of unmodified ethylene/α-olefin random copolymer

The unmodified ethylene/α-olefin random copolymer used in the invention can be prepared by random copolymerizing ethylene and an α-olefin of 6 to 20 carbon atoms in the presence of a vanadium catalyst comprising a soluble vanadium compound and an alkylaluminum halide compound or a zirconium catalyst comprising a metallocene compound of zirconium and an organoaluminum oxy-compound, as described above.

Examples of the soluble vanadium compounds used for the vanadium catalysts include vanadium tetrachloride, vanadium oxytrichloride, vanadium monoethoxydichloride, vanadium triacetylacetonate and oxyvanadium triacetylacetonate.

Examples of the alkylaluminum halide compounds used for the vanadium catalysts include ethylaluminum dichloride, diethylaluminum monochloride, ethylaluminum sesquichloride, diethylaluminum monobromide, diisobutylaluminum monochloride, isobutylaluminum dichloride and isobutylaluminum sesquichloride.

Examples of the metallocene compounds of zirconium used for the zirconium catalysts include ethylenebis (indenyl)zirconium dibromide, dimethylsilylenebis(2-methylindenyl)zirconium dichloride, bis(cyclopentadienyl) zirconium dibromide and bis(dimethylcyclopentadienyl) zirconium dichloride.

Examples of the organoaluminum oxy-compounds used for the zirconium catalysts include aluminoxane and benzene-insoluble organoaluminum oxy-compounds.

The zirconium catalyst may contain an organoaluminum compound together with the metallocene compound of zirconium and the organoaluminum oxy-compound.

Examples of the organoaluminum compounds include triisobutylaluminum, dimethylaluminum chloride and methylaluminum sesquichloride.

Copolymerization of ethylene and the α-olefin using the vanadium catalyst or the zirconium catalyst can be carried out in either a solution state, a suspension state or an intermediate state between those states, and in each case an inert solvent is preferably used as a reaction medium.

As described above, the linear and long-chain branched ethylene/α-olefin random copolymers preferably used in the invention can be each prepared by random copolymerizing ethylene and an α-olefin of 6 to 20 carbon atoms in the presence of a metallocene catalyst containing the corresponding specific metallocene compound.

There is no specific limitation on the metallocene catalyst used herein, except that the metallocene catalyst contains a metallocene compound [a]. For example, the metallocene catalyst may be formed from the metallocene compound [a], and an organoaluminum oxy-compound [b] and/or a compound [c] which reacts with the metallocene compound [a] to form an ion pair, or it may be formed from the metallocene compound [a], the organoaluminum oxy-compound [b] and/or the ion pair-forming compound [c], and an organoaluminum compound [d].

Metallocene compound [a]

The metallocene compound [a] used in the preparation of the linear ethylene/α-olefin copolymer rubber is, for example, a compound represented by the following formula [I].

$$ML_x \qquad [I]$$

In the formula [I], M is a transition metal selected from Group IVB of the periodic table, specifically, zirconium, titanium or hafnium, and x is a valence of the transition metal.

L is a ligand coordinated to the transition metal. At least one ligand L is a ligand having cyclopentadienyl skeleton, and the ligand having cyclopentadienyl skeleton may have a substituent.

Examples of the ligands having cyclopentadienyl skeleton include cyclopentadienyl group; alkyl or cycloalkyl substituted cyclopentadienyl groups, such as methylcyclopentadienyl, ethylcyclopentadienyl, n- or i-propylcyclopentadienyl, n-, i-, sec- or t-butylcyclopentadienyl, hexylcyclopentadienyl, octylcyclopentadienyl, dimethylcyclopentadienyl, trimethylcyclopentadienyl, tetramethylcyclopentadienyl, pentamethylcyclopentadienyl, methylethylcyclopentadienyl, methylpropylcyclopentadienyl, methylbutylcyclopentadienyl, methylhexylcyclopentadienyl, methylbenzylcyclopentadienyl, ethylbutylcyclopentadienyl, ethylhexylcyclopentadienyl and methylcyclohexylcyclopentadienyl; indenyl group; 4,5,6,7-tetrahydroindenyl group; and fluorenyl group.

These groups may be substituted with halogen atoms or trialkylsilyl groups.

Of the above groups, particularly preferable are alkyl substituted cyclopentadienyl groups.

When the compound represented by the formula [I] has two or more groups having cyclopentadienyl skeleton as the ligands L, two of them may be bonded to each other through an alkylene group such as ethylene or propylene, a substituted alkylene group such as isopropylidene or diphenylmethylene, a silylene group, or a substituted silylene group such as dimethylsilylene, diphenylsilylene or methylphenylsilylene.

Examples of L other than the ligand having cyclopentadienyl skeleton (sometimes referred to simply as "other L" hereinafter) include hydrocarbon groups of 1 to 12 carbon atoms, alkoxy groups, aryloxy groups, halogen atoms, hydrogen and sulfonic acid-containing groups (—SO₃Rᵃ wherein the Rᵃ is an alkyl group, an alkyl group substituted with a halogen atom, an aryl group, or an aryl group substituted with a halogen atom or an alkyl group).

Examples of the hydrocarbon groups of 1 to 12 carbon atoms include alkyl groups, cycloalkyl groups, aryl groups and aralkyl groups.

More specifically, there can be mentioned:

alkyl groups, such as methyl, ethyl, n-propyl, isopropyl, n-butyl, isobutyl, sec-butyl, t-butyl, pentyl, hexyl, octyl, decyl and dodecyl;

cycloalkyl groups, such as cyclopentyl and cyclohexyl; aryl groups, such as phenyl and tolyl; and aralkyl group, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the sulfonic acid-containing group ($-SO_3R^a$) include methanesulfonato, p-toluenesulfonato, trifluoromethansulfonate and p-chlorobenzenesulfonato.

Examples of the halogen atoms include fluorine, chlorine, bromine and iodine.

The metallocene compound of the above formula wherein the valence of the transition metal is 4 is more is specifically represented by the following formula [I-a]:

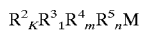

$$R^2{}_kR^3{}_lR^4{}_mR^5{}_nM \quad [\text{I-a}]$$

wherein M is the above-mentioned transition metal, $R^2$ is a group (ligand) having cyclopentadienyl skeleton, $R^3$, $R^4$ and $R^5$ are each independently a group having cyclopentadienyl skeleton or the other L in the above formula [I], k is an integer of not less than 1, and k+l+m+n=4.

Listed below are examples of the metallocene compounds containing zirconium as M and containing at least two ligands having cyclopentadienyl skeleton.

Bis(cyclopentadienyl)zirconium monochloride monohydride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)zirconium phenoxymonochloride,
Bis(methylcyclopentadienyl)zirconium dichloride,
Bis(ethylcyclopentadienyl)zirconium dichloride,
Bis(n-propylcyclopentadienyl)zirconium dichloride,
Bis(isopropylcyclopentadienyl)zirconium dichloride,
Bis(t-butylcyclopentadienyl)zirconium dichloride,
Bis(n-butylcyclopentadienyl)zirconium dichloride,
Bis(sec-butylcyclopentadienyl)zirconium dichloride,
Bis(isobutylcyclopentadienyl)zirconium dichloride,
Bis(hexylcyclopentadienyl)zirconium dichloride,
Bis(octylcyclopentadienyl)zirconium dichloride,
Bis(indenyl)zirconium dichloride,
Bis(4,5,6,7-tetrahydroindenyl)zirconium dichloride,
Bis(indenyl)zirconium dibromide,
Bis(cyclopentadienyl)zirconium dimethyl,
Bis(cyclopentadienyl)zirconium methoxychloride,
Bis(cyclopentadienyl)zirconium ethoxychloride,
Bis(fluorenyl)zirconium dichloride,
Bis(cyclopentadienyl)zirconiumbis(methanesulfonato),
Bis(cyclopentadienyl)zirconiumbis(p-toluenesulfonato),
Bis(cyclopentadienyl)zirconiumbis(trifluoromethanesulfonato),
Bis(methylcyclopentadienyl)zirconiumbis(trifluoromethanesulfonato),
Bis(ethylcyclopentadienyl)zirconiumbis(trifluoromethanesulfonato),
Bis(propylcyclopentadienyl)zirconiumbis(trifluoromethanesulfonato),
Bis(butylcyclopentadienyl)zirconiumbis(trifluoromethanesulfonato),
Bis(hexylcyclopentadienyl)zirconiumbis(trifluoromethanesulfonato),
Bis(1,3-dimethylcyclopentadienyl)zirconium-bis(trifluoromethanesulfonato),
Bis(1-methyl-3-ethylcyclopentadienyl)zirconium-bis(trifluoromethanesulfonato),
Bis(1-methyl-3-propylcyclopentadienyl)zirconium-bis(trifluoromethanesulfonato),
Bis(1-methyl-3-butylcyclopentadienyl)zirconium-bis(trifluoromethanesulfonato),
Bis(1,3-dimethylcyclopentadienyl)zirconium dichloride,
Bis(1-methyl-3-ethylcyclopentadienyl)zirconium dichloride,
Bis(1-methyl-3-propylcyclopentadienyl)zirconium dichloride,
Bis(1-methyl-3-butylcyclopentadienyl)zirconium dichloride,
Bis(1-methyl-3-hexylcyclopentadienyl)zirconium dichloride,
Bis(1-methyl-3-octylcyclopentadienyl)zirconium dichloride,
Bis(1-ethyl-3-butylcyclopentadienyl)zirconium dichloride,
Bis(trimethylcyclopentadienyl)zirconium dichloride,
Bis(tetramethylcyclopentadienyl)zirconium dichloride,
Bis(pentamethylcyclopentadienyl) zirconium dichloride,
Bis(methylbenzylcyclopentadienyl)zirconium dichloride,
Bis(ethylhexylcyclopentadienyl)zirconium dichloride, and
Bis(methylcyclohexylcyclopentadienyl)zirconium dichloride.

Also employable in the invention are compounds wherein the 1,3-position substituted cyclopentadienyl group is replaced with a 1,2-position substituted cyclopentadienyl group in the above-exemplified compounds.

Further, also employable is a bridge type metallocene compound represented by the above formula [I-a] wherein at least two of $R^2$, $R^3$, $R^4$ and $R^5$, e.g., $R^2$ and $R^3$, are groups (ligands) having cyclopentadienyl skeleton, and these at least two groups are bonded to each other through an alkylene group, a substituted alkylene group, a silylene group or a substituted silylene group. In this case, $R^4$ and $R^5$ are each independently the other L, which is described in the formula [I].

Listed below are examples of such bridge type metallocene compounds.
Ethylenebis(indenyl)dimethylzirconium,
Ethylenebis(indenyl)zirconium dichloride,
Ethylenebis(indenyl)zirconiumbis(trifluoromethanesulfonato),
Ethylenebis(indenyl)zirconiumbis(methanesulfonato),
Ethylenebis(indenyl)zirconiumbis(p-toluenesulfonato),
Ethylenebis(indenyl)zirconiumbis(p-chlorobenzenesulfonato),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconiumbis(trifluoromethanesulfonato),
Dimethylsilylenebis(4,5,6,7-tetrahydroindenyl)zirconium dichloride,
Dimethylsilylenebis(cyclopentadienylfluorenyl)zirconium dichloride,
Diphenylsilylenebis(indenyl)zirconium dichloride, and
Methylphenylsilylenebis(indenyl)zirconium dichloride.

Furthermore, a metallocene compound of the following formula [A], which is described in Japanese Patent Laid-Open Publication No. 268307/1992, is also employable.

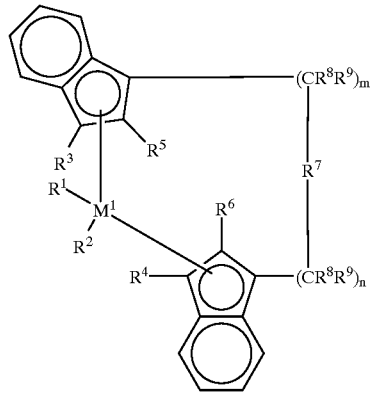
[A]

In the formula (A), $M^1$ is a metal of Group IVB of the periodic table, specifically, titanium, zirconium or hafnium.

$R^1$ and $R^2$ may be the same as or different from each other and are each hydrogen, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atoms, an alkylaryl group of 7 to 40 carbon atoms, preferably 7 to 12 carbon atoms, an arylalkenyl group of 8 to 40 carbon atoms, preferably 8 to 12 carbon atoms, or a halogen atom, preferably chlorine.

$R^3$ and $R^4$ may be the same as or different from each other, and are each hydrogen, a halogen atom, preferably fluorine, chlorine or bromine, an alkyl group of 1 to 10 carbon atoms, preferably 1 to 4 carbon atoms, which may be halogenated, an aryl group of 6 to 10 carbon atoms, preferably 6 to 8 carbon atoms, or a group of $-NR^{10}_2$, $-SR^{10}$, $-OSiR^{10}_3$, $-SiR^{10}_3$ or $-PR^{10}_2$ (the $R^{10}$ is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^3$ and $R^4$ are each preferably hydrogen.

$R^5$ and $R^6$ may be the same as or different from each other, preferably the same as each other, and $R^5$ and $R^6$ are the same as $R^3$ and $R^4$, but each of $R^5$ and $R^6$ is not hydrogen. $R^5$ and $R^6$ are each preferably an alkyl group of 1 to 4 carbon atoms which may be halogenated, specifically, methyl, ethyl, propyl, isopropyl, butyl, isobutyl or trifluoromethyl, preferably methyl.

$R^7$ is represented by the following formulae:

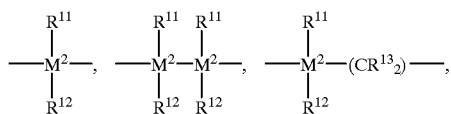

-continued

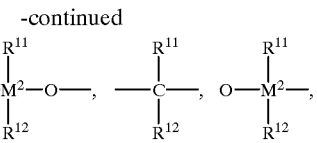

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$ wherein $R^{11}$, $R^{12}$ and $R^{13}$ may be the same as or different from each other; and they are each hydrogen, a halogen atom, an alkyl group of 1 to 10 carbon atoms, preferably 1 to 4 carbon atoms, more preferably methyl, a fluoroalkyl group of 1 to 10 carbon atoms, preferably $CF_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms; or $R^{11}$ and $R^{12}$ or $R^{11}$ and $R^{13}$ may form a ring together with a carbon atom to which they are bonded.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ may be the same as or different from each other, and they are the same as $R^{11}$.

m and n may be the same as or different from each other, and are each 0, 1 or 2, preferably 0 or 1, and m+n is 0, 1 or 2, preferably 0 or 1.

Particularly preferred metallocene compounds satisfying the above conditions are those represented by the following formulae (i) to (iii).

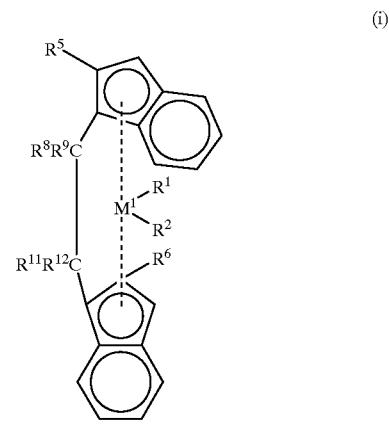
(i)

-continued (ii)

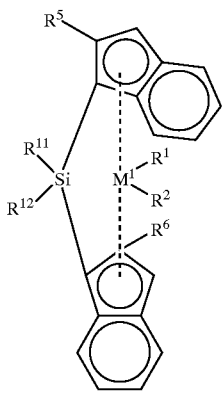

(iii)

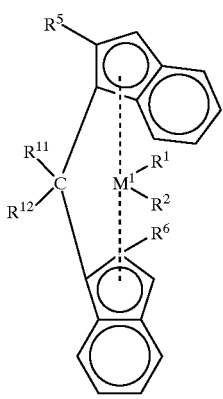

In the above formulae (i), (ii) and (iii), $M^1$ is Zr or Hf, $R^1$ and $R^2$ are each methyl or chlorine, $R^5$ and $R^6$ are each methyl, ethyl or trifluoromethyl, and $R^8$, $R^9$, $R^{11}$ and $R^{12}$ are the same as ones described above.

Of the compounds represented by the formulae (i), (ii) and (iii), the following compounds are particularly preferable.

rac-Ethylene(2-methyl-1-indenyl)$_2$-zirconium dichloride, rac-Dimethylsilylene(2-methyl-1-indenyl)$_2$-zirconium dichloride, rac-Dimethylsilylene(2-methyl-1-indenyl)$_2$-zirconium dimethyl, rac-Ethylene(2-methyl-1-indenyl)$_2$-zirconium dimethyl, rac-Phenyl(methyl)silylene-(2-methyl-1-indenyl)$_2$-zirconium dichloride, rac-Diphenyl-silylene-(2-methyl-1-indenyl)$_2$-zirconium dichloride, rac-Methylethylene(2-methyl-1-indenyl)$_2$-zirconium dichloride, and rac-Dimethylsilylene(2-ethyl-1-indenyl)$_2$-zirconium dichloride.

The metallocene compounds mentioned above can be prepared by conventionally known processes (see: Japanese Patent Laid-Open Publication No. 268307/1992).

In the present invention, a transition metal compound (metallocene compound) represented by the following formula [B] is also employable.

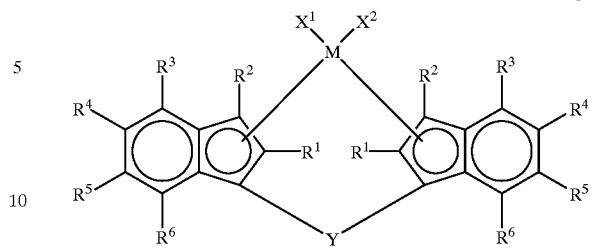

[B]

In the formula [B], M is a transition metal atom of Group IVB of the periodic table, specifically, titanium, zirconium or hafnium.

$R^1$ and $R^2$ are each independently hydrogen, a halogen atom, a hydrocarbon group of 1 to 20 carbon atoms, a halogenated hydrocarbon group of 1 to 20 carbon atoms, a silicon-containing group, an oxygen-containing group, a sulfur-containing group, a nitrogen-containing group or a phosphorus-containing group.

Examples of the halogen atoms include fluorine, chlorine, bromine and iodine.

Examples of the hydrocarbon groups of 1 to 20 carbon atoms include alkyl groups, such as methyl, ethyl, propyl, butyl, hexyl, cyclohexyl, octyl, nonyl, dodecyl, eicosyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthracenyl and phenanthryl.

Examples of the halogenated hydrocarbon groups include those wherein the above-exemplified hydrocarbon groups are substituted with halogen atoms.

Examples of the silicon-containing groups include monohydrocarbon-substituted silyl groups, such as methylsilyl and phenylsilyl; dihydrocarbon-substituted silyl groups, such as dimethylsilyl and diphenylsilyl; trihydrocarbon-substituted silyl groups, such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; silyl ethers of the hydrocarbon-substituted silyls, such as trimethylsilyl ether; silicon-substituted alkyl groups, such as trimethylsilylmethyl; and silicon-substituted aryl groups, such as trimethylsilylphenyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include phosphino groups, such as dimethylphosphino and diphenylphosphino.

Of these, $R^1$ is preferably a hydrocarbon group, particularly preferably a hydrocarbon group of 1 to 3 carbon atoms, i.e., methyl, ethyl or propyl. $R^2$ is preferably hydrogen or a hydrocarbon group, particularly preferably hydrogen or a hydrocarbon group of 1 to 3 carbon atoms, i.e., methyl, ethyl or propyl.

$R^3$, $R^4$, $R^5$ and $R^6$ are each independently hydrogen, a halogen atom, a hydrocarbon group of 1 to 20 carbon atoms or a halogenated hydrocarbon group of 1 to 20 carbon atoms. Of these, hydrogen, the hydrocarbon group or the halogenated hydrocarbon group is preferable. At least one pair out of pairs of $R^3$ and $R^4$, $R^4$ and $R^5$, and $R^5$ and $R^6$ may form a monocyclic aromatic ring together with a carbon atom to which they are bonded.

When there are two or more hydrocarbon groups or halogenated hydrocarbon groups, the groups other than those for forming the aromatic ring may be bonded to each other to form a ring. When $R^6$ is a substituent other than the aromatic group, it is preferably hydrogen.

Examples of the halogen atoms, the hydrocarbon groups of 1 to 20 carbon atoms and the halogenated hydrocarbon groups of 1 to 20 carbon atoms are the same as those described for $R^1$ and $R^2$.

Examples of the ligands, which contain a monocyclic aromatic ring formed by at least one pair of $R^3$ and $R^4$, $R^4$ and $R^5$, and $R^5$ and $R^6$ and which is coordinated to M, include the following ones.

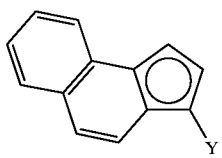

(1)

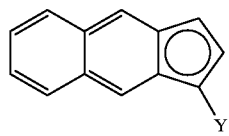

(2)

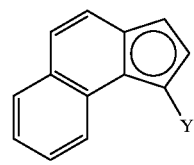

(3)

Of these, the ligand represented by the formula (1) is preferable.

The aromatic ring may be substituted with a halogen atom, a hydrocarbon group of 1 to 20 carbon atoms or a halogenated hydrocarbon group or 1 to 20 carbon atoms.

Examples of the halogen atoms, the hydrocarbon groups of 1 to 20 carbon atoms and the halogenated hydrocarbon groups of 1 to 20 carbon atoms used as the substituents of the aromatic ring are the same as those described for $R^1$ and $R^2$.

$X^1$ and $X^2$ are each independently hydrogen, a halogen atom, a hydrocarbon group of 1 to 20 carbon atoms, a halogenated hydrocarbon group of 1 to 20 carbon atoms, an oxygen-containing group or a sulfur-containing group.

Examples of the halogen atoms, the hydrocarbon groups of 1 to 20 carbon atoms, the halogenated hydrocarbon groups of 1 to 20 carbon atoms and the oxygen-containing groups are the same as those described for $R^1$ and $R^2$.

Examples of the sulfur-containing groups include the same groups as described for $R^1$ and $R^2$; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$_7$—, —P(R$^7$)—, —P(O)(R$^7$)—, —BR$^7$— or —AlR$^7$— (the $R^7$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl) silylene; and alkyldisilylene, alkylaryldisilylene and aryldisilylene groups, such as tetramethyl-1,2-disilylene and tetraphenyl-1,2-disilylene.

Examples of the divalent germanium-containing groups include those wherein silicon is replaced with germanium in the above-exemplified divalent silicon-containing groups.

Examples of the divalent tin-containing groups include those wherein silicon is replaced with tin in the above-exemplified divalent silicon-containing groups.

$R^7$ is the same halogen atom, hydrocarbon group of 1 to 20 carbon atoms or halogenated hydrocarbon group of 1 to 20 carbon atoms as described for $R^1$ or $R^2$.

Of the above groups, preferable are divalent silicon-containing groups, divalent germanium-containing groups and divalent tin-containing group, and more preferable are divalent silicon-containing groups. Among them, particularly preferable are alkylsilylene groups, alkylarylsilylene groups and arylsilylene groups.

Listed below are examples of the transition metal compounds represented by the formula [B].

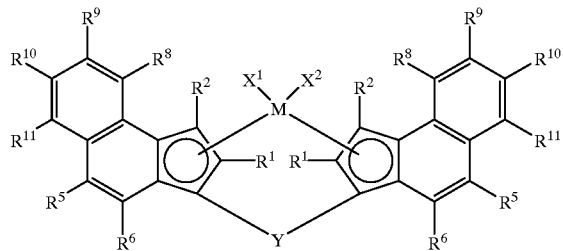

| R¹ | R² | R⁵ | R⁶ | R⁸ | R⁹ | R¹⁰ | R¹¹ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMePh | Cl | Cl | Zr |
| CH₃ | H | H | H | H | H | H | H | SiPh₂ | Cl | Cl | Zr |
| CH₃ | H | H | H | H | H | H | H | Si(pMePh)₂ | Cl | Cl | Zr |
| CH₃ | H | H | H | H | H | H | H | Si(pClPh)₂ | Cl | Cl | Zr |
| CH₃ | H | H | H | H | H | H | H | C₂H₄ | Cl | Cl | Zr |
| CH₃ | H | H | H | H | H | H | H | GeMe₂ | Cl | Cl | Zr |
| CH₃ | H | H | H | H | H | H | H | SnMe₂ | Cl | Cl | Zr |
| CH₃ | H | H | H | H | H | H | H | SiMe₂ | Br | Br | Zr |
| CH₃ | H | H | H | H | H | H | H | SiMe₂ | Cl | OSO₂CH₃ | Zr |
| CH₃ | H | H | H | H | H | H | H | SiMe₂ | Cl | SO₂CH₃ | Zr |
| CH₃ | H | H | H | H | H | H | H | SiMe₂ | Cl | Cl | Ti |
| CH₃ | H | H | H | H | H | H | H | SiMe₂ | Cl | Cl | Hf |
| C₂H₅ | H | H | H | H | H | H | H | SiMe₂ | Cl | Cl | Zr |
| nC₃H₇ | H | H | H | H | H | H | H | SiMe₂ | Cl | Cl | Zr |
| C₆H₅ | H | H | H | H | H | H | H | SiMe₂ | Cl | Cl | Zr |
| CH₃ | CH₃ | H | H | H | H | H | H | SiMe₂ | Cl | Cl | Zr |
| CH₃ | CH₃ | H | H | H | H | H | H | SiPh₂ | Cl | Cl | Zr |
| CH₃ | CH₃ | CH₃ | H | H | H | H | H | SiMe₂ | Cl | Cl | Zr |
| CH₃ | H | Cl | H | H | H | H | H | SiMe₂ | Cl | Cl | Zr |
| CH₃ | H | CH₃ | H | H | H | H | H | SiMe₂ | Cl | Cl | Zr |
| CH₃ | H | C₂H₅ | H | H | H | H | H | SiMe₂ | Cl | Cl | Zr |
| CH₃ | H | C₆H₅ | H | H | H | H | H | SiMe₂ | Cl | Cl | Zr |
| CH₃ | H | H | CH₃ | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*¹ | CH₃ | H | H | H | CH₂*¹ | SiMe₂ | Cl | Cl | Zr |
| CH₃ | H | H | H | H | H | H | C₆H₅ | SiMe₂ | Cl | Cl | Zr |

*¹: R⁵ and R¹¹ are bonded to each other to form a five-member ring.
Me: methyl; Et: ethyl; Ph: phenyl.

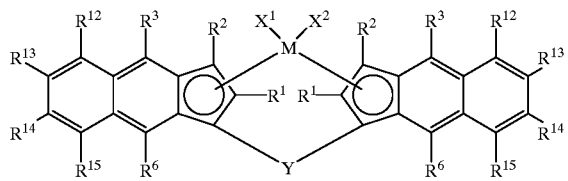

| R¹ | R² | R³ | R⁶ | R¹² | R¹³ | R¹⁴ | R¹⁵ | Y | X¹ | X² | M |
|---|---|---|---|---|---|---|---|---|---|---|---|
| H | H | H | H | H | H | H | H | SiMe₂ | Cl | Cl | Zr |
| CH₃ | H | H | H | H | H | H | H | SiMe₂ | Cl | Cl | Zr |
| CH₃ | H | H | H | H | H | H | H | SiMe₂ | Cl | Cl | Zr |
| CH₃ | CH₃ | H | H | H | H | H | H | SiMe₂ | Cl | Cl | Zr |
| CH₃ | H | CH₃ | H | H | H | H | H | SiMe₂ | Cl | Cl | Zr |
| CH₃ | H | CH₃ | CH₃ | H | H | H | H | SiMe₂ | Cl | Cl | Zr |
| CH₃ | H | CH₂*² | CH₂*² | CH₂*² | H | H | CH₂*² | SiMe₂ | Cl | Cl | Zr |
| CH₃ | H | CH₃ | CH₃ | CH₃ | H | H | CH₃ | SiMe₂ | Cl | Cl | Zr |

*²: R³ and R¹², and R⁶ and R¹⁵ are bonded to each other to form a five-member ring respectively.
Me: methyl; Ph: phenyl -continued

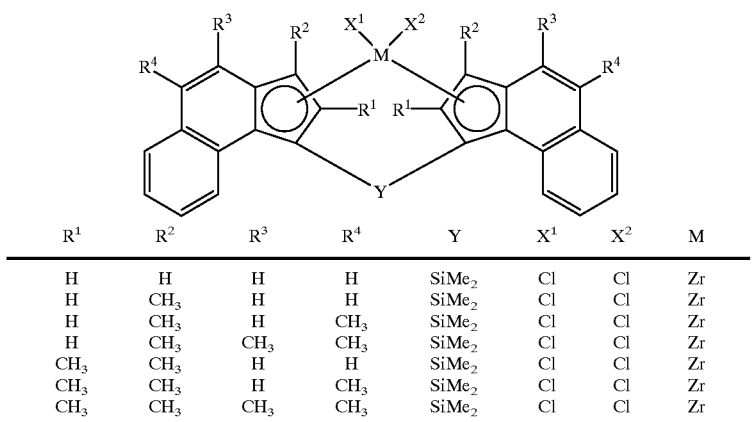

| R¹ | R² | R³ | R⁴ | Y | X¹ | X² | M |
|---|---|---|---|---|---|---|---|
| H | H | H | H | SiMe₂ | Cl | Cl | Zr |
| H | CH₃ | H | H | SiMe₂ | Cl | Cl | Zr |
| H | CH₃ | H | CH₃ | SiMe₂ | Cl | Cl | Zr |
| H | CH₃ | CH₃ | CH₃ | SiMe₂ | Cl | Cl | Zr |
| CH₃ | CH₃ | H | H | SiMe₂ | Cl | Cl | Zr |
| CH₃ | CH₃ | H | CH₃ | SiMe₂ | Cl | Cl | Zr |
| CH₃ | CH₃ | CH₃ | CH₃ | SiMe₂ | Cl | Cl | Zr |

Me: methyl.

Also employable in the invention are transition metal compounds wherein zirconium is replaced with titanium or hafnium in the above-mentioned compounds.

A racemic modification of the transition metal compound is generally used as the olefin polymerization catalyst component, but R type or S type is also employable.

The indene derivative ligands of the transition metal compounds can be synthesized in accordance with ordinary organic synthesis through, for example, the reaction route described below.

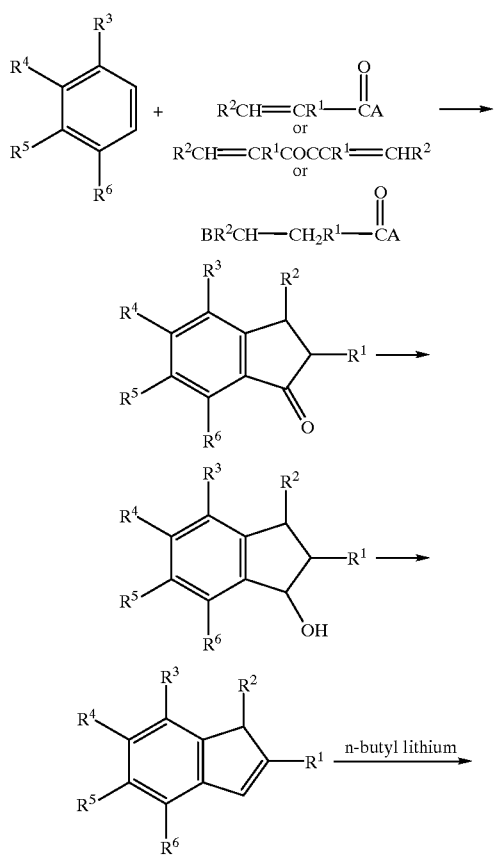

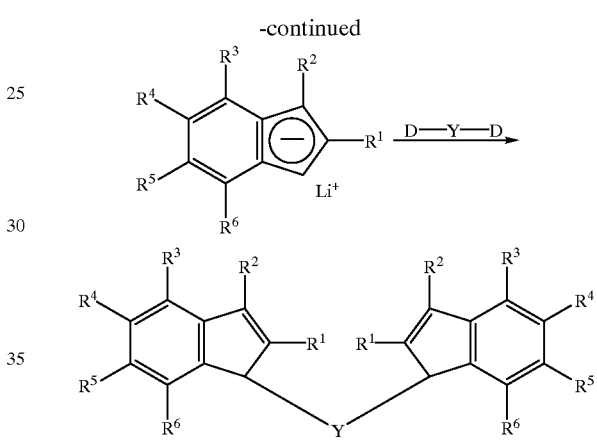

A, B and D represent halogen atoms.

The transition metal compounds employable in the invention can be synthesized from these indene derivatives in accordance with conventionally known processes, for example, a process described in Japanese Patent Laid-Open Publication No. 268307/1992.

In the present invention, a transition metal compound (metallocene compound) represented by the following formula [C] is also employable.

[C]

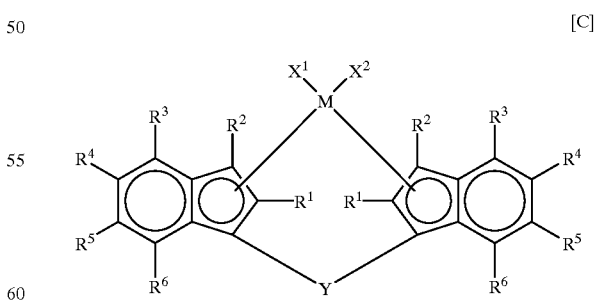

In the formula [C], M, $R^1$, $R^2$, $R^3$, $R^4$, $R^5$ and $R^6$ are the same as those in the aforesaid formula [B].

Among $R^3$, $R^4$, $R^5$ and $R^6$, two groups including $R^3$ are preferably alkyl groups, and it is more preferred that $R^3$ and $R^5$, or $R^3$ and $R^6$ are alkyl groups. These alkyl groups are preferably secondary or tertiary alkyl groups, and they may be substituted with halogen atoms or silicon-containing groups. Examples of the halogen atoms and the silicon-containing groups include the same substituents as described for $R^1$ and $R^2$.

Of the groups indicated by $R^3$, $R^4$, $R^5$ and $R^6$, groups other than the alkyl groups are each preferably hydrogen.

Examples of the alkyl groups (the hydrocarbon groups of 1 to 20 carbon atoms) include chain alkyl groups and cyclic alkyl groups, such as methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl and adamantyl; and arylalkyl groups, such as benzyl, phenylethyl, phenylpropyl and tolylmethyl. These groups may contain a double bond or a triple bond.

Two groups selected from $R^3$, $R^4$, $R^5$ and $R^6$ may be bonded to each other to form a monocyclic or polycyclic ring other than the aromatic ring.

Examples of the halogen atoms are the same as those described for $R^1$ and $R^2$.

$X^1$, $X^2$, Y and $R^7$ are the same as those in the aforesaid formula [B].

Listed below are examples of the metallocene compounds (transition metal compounds) represented by the formula [C].

rac-Dimethylsilylene-bis(4,7-dimethyl-1-indenyl)zirconium dichloride,
rac-Dimethylsilylene-bis(2,4,7-trimethyl-1-indenyl)zirconium dichloride,
rac-Dimethylsilylene-bis(2,4,6-trimethyl-1-indenyl)zirconium dichloride,
rac-Dimethylsilylene-bis(2,5,6-trimethyl-1-indenyl)zirconium dichloride,
rac-Dimethylsilylene-bis(2,4,5,6-tetramethyl-1-indenyl)zirconium dichloride,
rac-Dimethylsilylene-bis(2,4,5,6,7-pentamethyl-1-indenyl)zirconium dichloride,
rac-Dimethylsilylene-bis(2-methyl-4-n-propyl-7-methyl-1-indenyl)zirconium dichloride,
rac-Dimethylsilylene-bis(4-i-propyl-7-methyl-1-indenyl)zirconium dichloride,
rac-Dimethylsilylene-bis(2-methyl-4-i-propyl-7-methyl-1-indenyl)zirconium dichloride,
rac-Dimethylsilylene-bis(2-methyl-4-i-propyl-6-methyl-1-indenyl)zirconium dichloride,
rac-Dimethylsilylene-bis(2-methyl-4-methyl-6-i-propyl-1-indenyl)zirconium dichloride,
rac-Dimethylsilylene-bis(2-methyl-4-i-propyl-5-methyl-1-indenyl)zirconium dichloride,
rac-Dimethylsilyl-bis(2-methyl-4,6-di(i-propyl)-1-indenyl)zirconium dichloride,
rac-Dimethylsilylene-bis(2-methyl-4,6-di(i-propyl)-7-methyl-1-indenyl)zirconium dichloride,
rac-Dimethylsilylene-bis(2-methyl-4-i-butyl-7-methyl-1-indenyl)zirconium dichloride,
rac-Dimethylsilylene-bis(2-methyl-4-sec-butyl-7-methyl-1-indenyl)zirconium dichloride,
rac-Dimethylsilylene-bis(2-methyl-4,6-di(sec-butyl)-1-indenyl)zirconium dichloride,
rac-Dimethylsilylene-bis(2-methyl-4-tert-butyl-7-methyl-1-indenyl)zirconium dichloride,
rac-Dimethylsilylene-bis(2-methyl-4-cyclohexyl-7-methyl-1-indenyl)zirconium dichloride,
rac-Dimethylsilylene-bis(2-methyl-4-benzyl-7-methyl-1-indenyl)zirconium dichloride,
rac-Dimethylsilylene-bis(2-methyl-4-phenylethyl-7-methyl-1-indenyl)zirconium dichloride,
rac-Dimethylsilylene-bis(2-methyl-4-phenyldichloromethyl-7-methyl-1-indenyl)zirconium dichloride,
rac-Dimethylsilylene-bis(2-methyl-4-chloromethyl-7-methyl-1-indenyl)zirconium dichloride,
rac-Dimethylsilylene-bis(2-methyl-4-trimethylsilylmethyl-7-methyl-1-indenyl)zirconium dichloride,
rac-Dimethylsilylene-bis(2-methyl-4-trimethylsiloxymethyl-7-methyl-1-indenyl)zirconium dichloride,
rac-Diethylsilylene-bis(2-methyl-4-i-propyl-7-methyl-1-indenyl)zirconium dichloride,
rac-Di(i-propyl)silylene-bis(2-methyl-4-i-propyl-7-methyl-1-indenyl)zirconium dichloride,
rac-Di(n-butyl)silylene-bis(2-methyl-4-i-propyl-7-methyl-1-indenyl)zirconium dichloride,
rac-Di(cyclohexyl)silylene-bis(2-methyl-4-i-propyl-7-methyl-1-indenyl)zirconium dichloride,
rac-Methylphenylsilylene-bis(2-methyl-4-i-propyl-7-methyl-1-indenyl)zirconium dichloride,
rac-Diphenylsilylene-bis(2-methyl-4-i-propyl-7-methyl-1-indenyl)zirconium dichloride,
rac-Diphenylsilylene-bis(2-methyl-4,6-di(i-propyl)-1-indenyl)zirconium dichloride,
rac-Di(p-tolyl)silylene-bis(2-methyl-4-i-propyl-7-methyl-1-indenyl)zirconium dichloride,
rac-Di(p-chlorophenyl)silylene-bis(2-methyl-4-i-propyl-7-methyl-1-indenyl)zirconium dichloride,
rac-Dimethylsilylene-bis(2-methyl-4-i-propyl-7-methyl-1-indenyl)zirconium dibromide,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-6-methyl-1-indenyl)zirconium dichloride,
rac-Dimethylsilylene-bis(2-ethyl-4-i-propyl-6-methyl-1-indenyl)zirconium dichloride, and
rac-Dimethylsilylene-bis(2-phenyl-4-i-propyl-6-methyl-1-indenyl)zirconium dichloride.

Also employable in the invention are transition metal compounds wherein zirconium is replaced with titanium or hafnium in the above-exemplified compounds.

A racemic modification of the transition metal compound is generally used, but R type or S type is also employable.

The indene derivative ligands of the transition metal compounds can be synthesized in accordance with ordinary organic synthesis through, for example, the reaction route previously described.

The transition metal compounds (metallocene compounds) represented by the formula [C] can be synthesized from these indene derivatives in accordance with conventionally known processes, for example, a process described in Japanese Patent Laid-Open Publication No. 268307/1992.

Of the metallocene compounds mentioned above, compounds represented by the following formulas [C-a] and [B-a] are particularly preferably employed. The metallocene compounds represented by the formula [C-a] are included in the compounds represented by the formula [C], and the metallocene compounds represented by the formula [B-a] are included in the compounds represented by the formula [B].

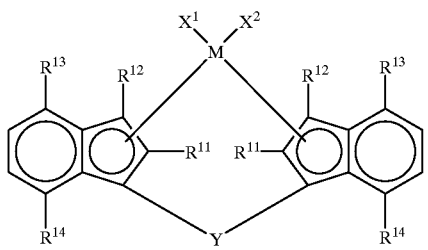

[C-a]

In the formula [C-a], M is a transition metal atom of Group IVB of the periodic table, specifically titanium, zirconium or hafnium, preferably zirconium.

$R^{11}$ and $R^{12}$ $R^{11}$ and $R^{12}$ are each hydrogen, a halogen atom, a hydrocarbon group of 1 to 20 carbon atoms which may be halogenated, a silicon-containing group, an oxygen-containing group, a sulfur-containing group, a nitrogen-containing group or a phosphorus-containing group.

Examples of the hydrocarbon groups of 1 to 20 carbon atoms include:

alkyl groups, such as methyl, ethyl, propyl, n-butyl, isobutyl, sec-butyl, tert-butyl, pentyl, neopentyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, α- or β-naphthyl, methylnaphthyl, anthracenyl, phenanthryl, benzylphenyl, pyrenyl, acenaphthyl, phenalenyl, aceanthrylenyl, tetrahydronaphthyl, indanyl and biphenylyl.

These hydrocarbon groups may be substituted with halogen atoms such as fluorine, chlorine, bromine and iodine, or organosilyl groups such as trimethylsilyl, triethylsilyl and triphenylsilyl.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzylsulfinato, p-toluenesulfinato, trimethylbenzenesulfinato and pentafluorobenzenesulfinato.

Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the phosphorus-containing groups include dimethylphosphino and diphenylphosphino.

Of these, $R^{11}$ is preferably a hydrocarbon group, particularly a hydrocarbon group of 1 to 3 carbon atoms, i.e., methyl, ethyl or propyl.

$R^{12}$ is preferably hydrogen or a hydrocarbon group, particularly hydrogen or a hydrocarbon group of 1 to 3 carbon atoms, i.e., methyl, ethyl or propyl.

$R^{13}$ and $R^{14}$ $R^{13}$ and $R^{14}$ are each an alkyl group of 1 to 20 carbon atoms, and examples thereof are the same as those described above. $R^{13}$ is preferably a secondary or tertiary alkyl group. $R^{14}$ may contain a double bond or a triple bond.

$X^1$ and $X^2$ $X^1$ and $X^2$ may be the same as or different from each other and are each hydrogen, a halogen atom, a hydrocarbon group of 1 to 20 carbon atoms, a halogenated hydrocarbon group of 1 to 20 carbon atoms, an oxygen-containing group or a sulfur-containing group. Examples of these groups are the same as those described above. $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, a divalent tin-containing group, —O—, —CO—, —S—, —SO—, —SO$_2$—, —NR$^{15}$—, —P(R$^{15}$)—, —P(O)(R$^{15}$)—, —BR$^{15}$— or —AlR$^{15}$— (The $R^{15}$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

$R^{15}$ is the same hydrogen, halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group. Listed below are examples of the metallocene compounds represented by the formula [C-a].

rac-Dimethylsilylene-bis(2,7-dimethyl-4-ethyl-1-indenyl)zirconium dichloride, rac-Dimethylsilylene-bis(2,7-dimethyl-4-n-propyl-1-indenyl)zirconium dichloride, rac-Dimethylsilylene-bis(2,7-dimethyl-4-i-propyl-1-indenyl)zirconium dichloride, rac-Dimethylsilylene-bis(2,7-dimethyl-4-n-butyl-1-indenyl)zirconium dichloride, rac-Dimethylsilylene-bis(2,7-dimethyl-4-sec-butyl-1-indenyl)zirconium dichloride, rac-Dimethylsilylene-bis(2,7-dimethyl-4-t-butyl-1-indenyl)zirconium dichloride, rac-Dimethylsilylene-bis(2,7-dimethyl-4-n-pentyl-1-indenyl)zirconium dichloride,
rac-Dimethylsilylene-bis(2,7-dimethyl-4-n-hexyl-1-indenyl)zirconium dichloride,
rac-Dimethylsilylene-bis(2,7-dimethyl-4-cyclohexyl-1-indenyl)zirconium dichloride,
rac-Dimethylsilylene-bis(2,7-dimethyl-4-methylcyclohexyl-1-indenyl)zirconium dichloride,
rac-Dimethylsilylene-bis(2,7-dimethyl-4-phenylethyl-1-indenyl)zirconium dichloride,
rac-Dimethylsilylene-bis(2,7-dimethyl-4-phenyldichloromethyl-1-indenyl)zirconium dichloride,
rac-Dimethylsilylene-bis(2,7-dimethyl-4-chloromethyl-1-indenyl)zirconium dichloride,
rac-Dimethylsilylene-bis(2,7-dimethyl-4-trimethylsilylmethyl-1-indenyl)zirconium dichloride,
rac-Dimethylsilylene-bis(2,7-dimethyl-4-trimethylsiloxymethyl-1-indenyl)zirconium dichloride,
rac-Diethylsilylene-bis(2,7-dimethyl-4-i-propyl-1-indenyl)zirconium dichloride,
rac-Di(i-propyl)silylene-bis(2,7-dimethyl-4-i-propyl-1-indenyl)zirconium dichloride,
rac-Di(n-butyl)silylene-bis(2,7-dimethyl-4-i-propyl-1-indenyl)zirconium dichloride,
rac-Di(cyclohexyl)silylene-bis(2,7-dimethyl-4-i-propyl-1-indenyl)zirconium dichloride,
rac-Methylphenylsilylene-bis(2,7-dimethyl-4-i-propyl-1-indenyl)zirconium dichloride,
rac-Methylphenylsilylene-bis(2,7-dimethyl-4-t-butyl-1-indenyl)zirconium dichloride,
rac-Diphenylsilylene-bis(2,7-dimethyl-4-t-butyl-1-indenyl)zirconium dichloride,
rac-Diphenylsilylene-bis(2,7-dimethyl-4-i-propyl-1-indenyl)zirconium dichloride,
rac-Diphenylsilylene-bis(2,7-dimethyl-4-ethyl-1-indenyl)zirconium dichloride,
rac-Di(p-tolyl)silylene-bis(2,7-dimethyl-4-i-propyl-1-indenyl)zirconium dichloride,
rac-Di(p-chlorophenyl)silylene-bis(2,7-dimethyl-4-i-propyl-1-indenyl)zirconium dichloride,
rac-Dimethylsilylene-bis(2-methyl-4-i-propyl-7-ethyl-1-indenyl)zirconium dibromide,
rac-Dimethylsilylene-bis(2,3,7-trimethyl-4-ethyl-1-indenyl)zirconium dichloride,
rac-Dimethylsilylene-bis(2,3,7-trimethyl-4-n-propyl-1-indenyl)zirconium dichloride,
rac-Dimethylsilylene-bis(2,3,7-trimethyl-4-i-propyl-1-indenyl)zirconium dichloride,
rac-Dimethylsilylene-bis(2,3,7-trimethyl-4-n-butyl-1-indenyl)zirconium dichloride,
rac-Dimethylsilylene-bis(2,3,7-trimethyl-4-sec-butyl-1-indenyl)zirconium dichloride,
rac-Dimethylsilylene-bis(2,3,7-trimethyl-4-t-butyl-1-indenyl)zirconium dichloride,
rac-Dimethylsilylene-bis(2,3,7-trimethyl-4-n-pentyl-1-indenyl)zirconium dichloride,
rac-Dimethylsilylene-bis(2,3,7-trimethyl-4-n-hexyl-1-indenyl)zirconium dichloride,
rac-Dimethylsilylene-bis(2,3,7-trimethyl-4-cyclohexyl-1-indenyl)zirconium dichloride,
rac-Dimethylsilylene-bis(2,3,7-trimethyl-4-methylcyclohexyl-1-indenyl)zirconium dichloride,
rac-Dimethylsilylene-bis(2,3,7-trimethyl-4-trimethylsilylmethyl-1-indenyl)zirconium dichloride,
rac-Dimethylsilylene-bis(2,3,7-trimethyl-4-trimethylsiloxymethyl-1-indenyl)zirconium dichloride,
rac-Dimethylsilylene-bis(2,3,7-trimethyl-4-phenylethyl-1-indenyl)zirconium dichloride,
rac-Dimethylsilylene-bis(2,3,7-trimethyl-4-phenyldichloromethyl-1-indenyl)zirconium dichloride,
rac-Dimethylsilylene-bis(2,3,7-trimethyl-4-chloromethyl-1-indenyl)zirconium dichloride,
rac-Diethylsilylene-bis(2,3,7-trimethyl-4-i-propyl-1-indenyl)zirconium dichloride,
rac-Di(i-propyl)silylene-bis(2,3,7-trimethyl-4-i-propyl-1-indenyl)zirconium dichloride,
rac-Di(n-butyl)silylene-bis(2,3,7-trimethyl-4-i-propyl-1-indenyl)zirconium dichloride,
rac-Di(cyclohexyl)silylene-bis(2,3,7-trimethyl-4-i-propyl-1-indenyl)zirconium dichloride,
rac-Methylphenylsilylene-bis(2,3,7-trimethyl-4-i-propyl-1-indenyl)zirconium dichloride,
rac-Methylphenylsilylene-bis(2,3,7-trimethyl-4-t-butyl-1-indenyl)zirconium dichloride,
rac-Diphenylsilylene-bis(2,3,7-trimethyl-4-t-butyl-1-indenyl)zirconium dichloride,
rac-Diphenylsilylene-bis(2,3,7-trimethyl-4-i-propyl-1-indenyl)zirconium dichloride,
rac-Diphenylsilylene-bis(2,3,7-trimethyl-4-ethyl-1-indenyl)zirconium dichloride,
rac-Di(p-tolyl)silylene-bis(2,3,7-trimethyl-4-i-propyl-1-indenyl)zirconium dichloride,
rac-Di(p-chlorophenyl)silylene-bis(2,3,7-trimethyl-4-i-propyl-1-indenyl)zirconium dichloride,
rac-Dimethylsilylene-bis(2-methyl-4-i-propyl-7-methyl-1-indenyl)zirconium dimethyl,
rac-Dimethylsilylene-bis(2-methyl-4-i-propyl-7-methyl-1-indenyl)zirconium methylchloride,
rac-Dimethylsilylene-bis(2-methyl-4-i-propyl-7-methyl-1-indenyl)zirconium-bis(methanesulfonato),
rac-Dimethylsilylene-bis(2-methyl-4-i-propyl-7-methyl-1-indenyl)zirconium-bis(p-phenylsulfinato),
rac-Dimethylsilylene-bis(2-methyl-3-methyl-4-i-propyl-7-methyl-1-indenyl)zirconium dichloride,
rac-Dimethylsilylene-bis(2-ethyl-4-i-propyl-7-methyl-1-indenyl)zirconium dichloride,
rac-Dimethylsilylene-bis(2-phenyl-4-i-propyl-7-methyl-1-indenyl)zirconium dichloride,
rac-Dimethylsilylene-bis(2-methyl-4-i-propyl-7-methyl-1-indenyl)titanium dichloride, and
rac-Dimethylsilylene-bis(2-methyl-4-i-propyl-7-methyl-1-indenyl)hafnium dichloride.

Of these, particularly preferable are compounds having a branched alkyl group such as i-propyl, sec-butyl or tert butyl at the 4-position.

In the invention, a racemic modification of the above-mentioned metallocene compound is generally used as the olefin polymerization catalyst component, but R type or S type is also employable.

The metallocene compounds can be synthesized from indene derivatives by known processes, for example, a process described in Japanese Patent Laid-Open Publication No. 268307/1992.

In the present invention, a compound represented by the following formula [B-a], which is described in European Patent No. 549,900 and Canadian Patent No. 2,084,017, is also preferably employed.

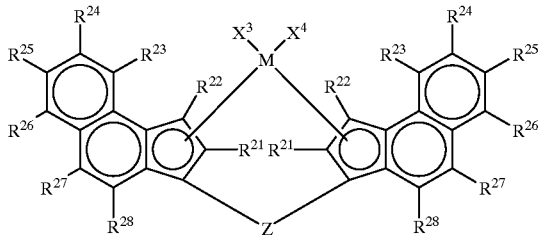

[B-a]

In the formula [B-a], M is a transition metal atom of Group IVB of the periodic table, specifically titanium, zirconium or hafnium, particularly preferably zirconium.

$R^{21}$s may be the same as or different from each other, and are each hydrogen, a halogen atom, preferably fluorine or chlorine, an alkyl group of 1 to 10 carbon atoms, preferably 1 to 4 carbon atoms, which may be halogenated, an aryl group of 6 to 10 carbon atoms, preferably 6 to 8 carbon atoms, —NR$_2$, —SR, —OSiR$_3$, —SiR$_3$ or —PR$_2$ (The R is a halogen atom, preferably chlorine, an alkyl group of 1 to 10 carbon atoms, preferably 1 to 3 carbon atoms, or an aryl group of 6 to 10 carbon atoms, preferably 6 to 8 carbon atoms).

$R^{22}$ to $R^{28}$ may be the same as or different from each other, and are each the same atom or group as described for $R^{21}$, and adjacent two or more groups out of $R^{22}$ to $R^{28}$ may form an aromatic or aliphatic ring together with an atom to which they are bonded.

$X^3$ and $X^4$ may be the same as or different from each other, and are each hydrogen, a halogen atom, OH group, an alkyl group of 1 to 10 carbon atoms, preferably 1 to 3 carbon atoms, an alkoxy group of 1 to 10 carbon atoms, preferably 1 to 3 carbon atoms, an aryl group of 6 to 10 carbon atoms, preferably 6 to 8 carbon atoms, an aryloxy group of 6 to 10 carbon atoms, preferably 6 to 8 carbon atoms, an alkenyl group of 2 to 10 carbon atoms, preferably 2 to 4 carbon atoms, an arylalkyl group of 7 to 40 carbon atoms, preferably 7 to 10 carbon atoms, an alkylaryl group of 7 to 40 carbon atoms, preferably 7 to 12 carbon atoms, or an arylalkenyl group of 8 to 40 carbon atoms, preferably 8 to 12 carbon atoms.

Z is

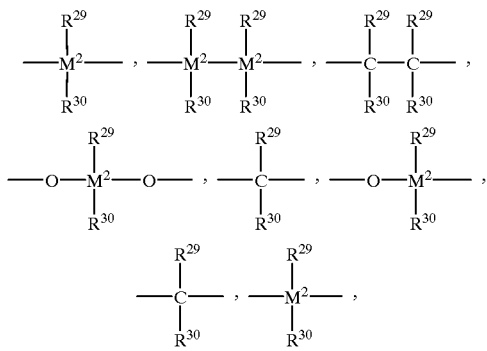

=BR$^{29}$, =AlR$^{29}$, —Ge, —Sn—, —O—, —S—, =SO$_2$, =SO$_2$, =NR$^{29}$, =CO, =PR$^{29}$ or =p(O)R$^{29}$.

In the above formulas, $R^{29}$ and $R^{30}$ may be the same as or different from each other and are each hydrogen, a halogen atom, an alkyl group of 1 to 10 carbon atom, preferably 1 to 4 carbon atoms, particularly preferably methyl, a fluoroalkyl group of 1 to 10 carbon atoms, preferably CF$_3$, an aryl group of 6 to 10 carbon atoms, preferably 6 to 8 carbon atoms, a fluoroaryl group of 6 to 10 carbon atoms, preferably pentafluorophenyl, an alkoxy group of 1 to 10 carbon atoms, preferably 1 to 4 carbon atoms, particularly preferably methoxy, an alkenyl group of 2 to 10 carbon atoms, preferably 2 to 4 carbon atoms, an arylalkyl group of 7 to 40 carbon atoms, preferably 7 to 10 carbon atoms, an arylalkenyl group of 8 to 40 carbon atoms, preferably 8 to 12 carbon atoms, or an alkylaryl group of 7 to 40 carbon atoms, preferably 7 to 12 carbon atoms.

$R^{29}$ and $R^{30}$ may form a ring together with an atom to which they are bonded.

$M^2$ is silicon, germanium or tin.

The alkyl group is a straight chain or branched alkyl group, and the halogen (for halogenation) is fluorine, chlorine, bromine or iodine, preferably fluorine or chlorine.

Of the compounds of the formula [B-a], preferable are those wherein M is zirconium or hafnium; $R^{21}$s are the same as each other, and are each an alkyl group of 1 to 4 carbon atoms; $R^{22}$ to $R^{28}$ may be the same as or different from each other, and are each hydrogen or an alkyl group of 1 to 4 carbon atoms; $X^3$ and $X^4$ may be the same as or different from each other, and are each an alkyl group of 1 to 3 carbon atoms or a halogen atom; and Z preferably is

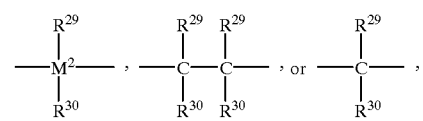

($M^2$ is silicon, and $R^{29}$ and $R^{30}$ may be the same as or different from each other and are each an alkyl group of 1 to 4 carbon atom or an aryl group of 6 to 10 carbon atoms).

Among such compounds, more preferable are those wherein the substituents $R^{22}$ and $R^{28}$ are each hydrogen, and $R^{23}$ to $R^{27}$ are each an alkyl group of 1 to 4 carbon atoms or hydrogen.

Still more preferable are compounds wherein M is zirconium; $R^{21}$s are the same as each other and are each an alkyl group of 1 to 4 carbon atoms; $R^{22}$ and $R^{28}$ are each hydrogen; $R^{23}$ to $R^{27}$ may be the same as or different from each other, and are each an alkyl group of 1 to 4 carbon atoms or hydrogen; $X^3$ and $X^4$ are each chlorine; and Z preferably is

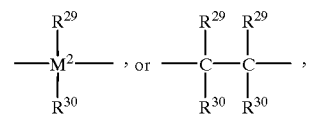

($M^2$ is silicon, and $R^{29}$ and $R^{30}$ may be the same as or different from each other and are each an alkyl group of 1 to 4 carbon atom or an aryl group of 6 to 10 carbon atoms).

Particularly preferable are compounds wherein M is zirconium; $R^{21}$s are each methyl; $R^{22}$ to $R^{28}$ are each hydrogen; $X^3$ and $X^4$ are chlorine; and Z preferably is

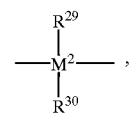

($M^2$ is silicon, and $R^{29}$ and $R^{30}$ may be the same as or different from each other and are each methyl or phenyl).

Listed below are some examples of the compounds represented by the formula [B-a].

rac-Dimethylsilylene-bis{1-(2-methyl-4,5-benzoindenyl)}zirconium dichloride,
rac-Dimethylsilylene-bis{1-(2-methyl-4,5-acenaphthocyclopentadienyl)}zirconium dichloride,
rac-Dimethylsilylene-bis{1-(2,3,6-trimethyl-4,5-benzoindenyl)}zirconium dichloride,
rac-Methylphenylsilylene-bis{1-(2-methyl-4,5-benzoindenyl)}zirconium dichloride,
rac-Methylphenylsilylene-bis{1-(2-methyl-4,5-acenaphthocyclopentadienyl)}zirconium dichloride,
rac-Methylphenylsilylene-bis{1-(4,5-benzoindenyl)}zirconium dichloride,
rac-Methylphenylsilylene-bis{1-(2,6-dimethyl-4,5-benzoindenyl)}zirconium dichloride, and
rac-Methylphenylsilylene-bis{1-(2,3,6-trimethyl-4,5-benzoindenyl)}zirconium dichloride.

Also employable are compounds wherein zirconium is replaced with titanium or hafnium in the above-exemplified compounds.

In the invention, a racemic modification of the metallocene compound represented by the formula [C-a] or [B-a] is generally used as the olefin polymerization catalyst component, but R type or S type is also employable.

The metallocene compounds mentioned above can be used in combination of two or more kinds.

The metallocene compound [a] employable for preparing the long-chain branched ethylene/α-olefin copolymer rubber that is preferably used in the invention is, for example, a compound represented by the following formula [II].

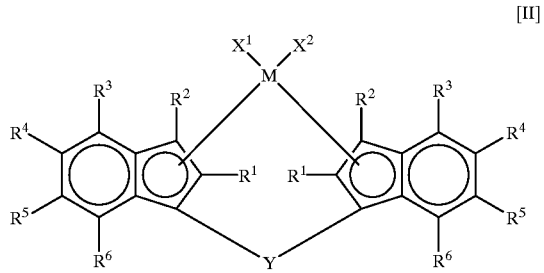

In the formula [II], M is a transition metal atom of Group IVB of the periodic table, specifically titanium, zirconium or hafnium, particularly preferably zirconium.

Substituent $R^1$ $R^1$ is a hydrocarbon group of 1 to 6 carbon atoms, and examples thereof include alkyl groups, such as methyl, ethyl, n-propyl, isopropyl, n-butyl, isobutyl, sec-butyl, tert-butyl, n-pentyl, neopentyl, n-hexyl and cyclohexyl; and alkenyl groups, such as vinyl and propenyl.

Of these, preferable are alkyl groups whose carbon bonded to the indenyl group is primary carbon. More preferable are alkyl groups of 1 to 4 carbon atoms, and particularly preferred are methyl and ethyl.

Substituents $R^2$, $R^4$, $R^5$ and $R^6$ $R^2$, $R^4$, $R^5$ and $R^6$ may be the same as or different from each other and are each hydrogen, a halogen atom or the same hydrocarbon group of 1 to 6 carbon atoms as described for $R^1$.

The halogen atom is fluorine, chlorine, bromine or iodine.

Substituent $R^3$ $R^3$ is an aryl group of 6 to 16 carbon atoms. This aryl group may be substituted with a halogen atom, a hydrocarbon group of 1 to 20 carbon atoms or an organosilyl group.

Examples of the aryl groups include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, phenyl, naphthyl, anthracenyl and phenanthryl are preferable.

Examples of the hydrocarbon groups of 1 to 20 carbon atoms serving as substituents of the aryl groups include:

alkyl groups, such as methyl, ethyl, propyl, butyl, hexyl, cyclohexyl, octyl, nonyl, dodecyl, eicosyl, norbornyl and adamantyl;

alkenyl groups, such as vinyl, propenyl and cyclohexenyl;

arylalkyl groups, such as benzyl, phenylethyl and phenylpropyl; and aryls groups, such as the above-exemplified aryl groups, tolyl, dimethylphenyl, trimethylphenyl, ethylphenyl, propylphenyl, methylnaphthyl and benzylphenyl.

Examples of the organosilyl groups include trimethylsilyl, triethylsilyl and triphenylsilyl.

$X^1$ and $X^2$ $X^1$ and $X^2$ are each hydrogen, a halogen atom, a hydrocarbon group of 1 to 20 carbon atoms which may be substituted with halogen, an oxygen-containing group or a sulfur-containing group. Examples of the halogen atoms and the hydrocarbon groups are the same as those mentioned above.

Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; and arylalkoxy groups, such as phenylmethoxy and phenylethoxy.

Examples of the sulfur-containing groups include substituents wherein oxygen is replaced with sulfur in the above-exemplified oxygen-containing groups; sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; and sulfinato groups, such as methylsulfinato, phenylsulfinato, benzenesulfinato, p-toluenesulfinato, trimethylbenzenesulfinato and pentafluorobenzenesulfinato.

Of these, $X^1$ and $X^2$ are each preferably a halogen atom or a hydrocarbon group of 1 to 20 carbon atoms.

Y

Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O) (R$^7$)—, —BR$^7$— or —AlR$^7$— (The R$^7$ is hydrogen, a halogen atom, a hydrocarbon group of 1 to 20 carbon atoms or a halogenated hydrocarbon group of 1 to 20 carbon atoms).

Examples of the divalent hydrocarbon groups of 1 to 20 carbon atoms include alkylene groups, such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups, such as diphenylmethylene and diphenyl-1,2-ethylene.

Examples of the divalent halogenated hydrocarbon groups include those wherein the above-exemplified divalent hydrocarbon groups of 1 to 20 carbon atoms are halogenated, such as chloromethylene.

Examples of the divalent silicon-containing groups include alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)

silylene; and alkyldisilyl, alkylaryldisilyl and aryldisilyl groups, such as tetramethyl-1,2-disilyl and tetraphenyl-1,2-disilyl.

Examples of the divalent germanium-containing groups include those wherein silicon is replaced with germanium in the above-exemplified divalent silicon-containing groups.

$R^7$ is the same halogen atom, hydrocarbon group of 1 to 20 carbon atoms or halogenated hydrocarbon group of 1 to 20 carbon atoms as described above.

Of these, Y is preferably a divalent silicon-containing group or a divalent germanium-containing group, more preferably a divalent silicon-containing group, particularly preferably an alkylsilylene group, an alkylarylsilylene group or an arylsilylene group.

Listed below are examples of the metallocene compounds represented by the above formula [II].

rac-Dimethylsilylene-bis(4-phenyl-1-indenyl)zirconium dichloride,
rac-Dimethylsilylene-bis{1-(2-methyl-4-phenylindenyl)}zirconium dichloride,
rac-Dimethylsilylene-bis(2-methyl-4-(α-naphthyl)-1-indenyl)zirconium dichloride,
rac-Dimethylsilylene-bis(2-methyl-4-(α-naphthyl)-1-indenyl)zirconium dichloride,
rac-Dimethylsilylene-bis(2-methyl-4-(1-anthracenyl)-1-indenyl)zirconium dichloride,
rac-Dimethylsilylene-bis(2-methyl-4-(2-anthracenyl)-1-indenyl)zirconium dichloride,
rac-Dimethylsilylene-bis(2-methyl-4-(9-anthracenyl)-1-indenyl)zirconium dichloride,
rac-Dimethylsilylene-bis(2-methyl-4-(9-phenanthryl)-1-indenyl)zirconium dichloride,
rac-Dimethylsilylene-bis(2-methyl-4-(p-fluorophenyl)-1-indenyl)zirconium dichloride,
rac-Dimethylsilylene-bis(2-methyl-4-(pentafluorophenyl)-1-indenyl)zirconium dichloride,
rac-Dimethylsilylene-bis(2-methyl-4-(p-chlorophenyl)-1-indenyl)zirconium dichloride,
rac-Dimethylsilylene-bis(2-methyl-4-(m-chlorophenyl)-1-indenyl)zirconium dichloride,
rac-Dimethylsilylene-bis(2-methyl-4-(o-chlorophenyl)-1-indenyl)zirconium dichloride,
rac-Dimethylsilylene-bis(2-methyl-4-(o,p-dichlorophenyl)-1-indenyl)zirconium dichloride,
rac-Dimethylsilylene-bis(2-methyl-4-(p-bromophenyl)-1-indenyl)zirconium dichloride,
rac-Dimethylsilylene-bis(2-methyl-4-(p-tolyl)-1-indenyl)zirconium dichloride,
rac-Dimethylsilylene-bis(2-methyl-4-(m-tolyl)-1-indenyl)zirconium dichloride,
rac-Dimethylsilylene-bis(2-methyl-4-(o-tolyl)-1-indenyl)zirconium dichloride,
rac-Dimethylsilylene-bis(2-methyl-4-(o,o'-dimethylphenyl)-1-indenyl)zirconium dichloride,
rac-Dimethylsilylene-bis(2-methyl-4-(p-ethylphenyl)-1-indenyl)zirconium dichloride,
rac-Dimethylsilylene-bis(2-methyl-4-(p-i-propylphenyl)-1-indenyl)zirconium dichloride,
rac-Dimethylsilylene-bis(2-methyl-4-(p-benzylphenyl)-1-indenyl)zirconium dichloride,
rac-Dimethylsilylene-bis(2-methyl-4-(p-biphenyl)-1-indenyl)zirconium dichloride,
rac-Dimethylsilylene-bis(2-methyl-4-(m-biphenyl)-1-indenyl)zirconium dichloride,
rac-Dimethylsilylene-bis(2-methyl-4-(p-trimethylsilylenephenyl)-1-indenyl)zirconium dichloride,
rac-Dimethylsilylene-bis(2-methyl-4-(m-trimethylsilylenephenyl)-1-indenyl)zirconium dichloride,
rac-Dimethylsilylene-bis(2-phenyl-4-phenyl)-1-indenyl)zirconium dichloride,
rac-Diethylsilylene-bis(2-methyl-4-phenyl)-1-indenyl)zirconium dichloride,
rac-Di(i-propyl)silylene-bis(2-methyl-4-phenyl-1-indenyl)zirconium dichloride,
rac-Di(n-butyl)silylene-bis(2-methyl-4-phenyl-1-indenyl)zirconium dichloride,
rac-Dicyclohexylsilylene-bis(2-methyl-4-phenyl-1-indenyl)zirconium dichloride,
rac-Methylphenylsilylene-bis(2-methyl-4-phenyl-1-indenyl)zirconium dichloride,
rac-Diphenylsilylene-bis(2-methyl-4-phenyl-1-indenyl)zirconium dichloride,
rac-Di(p-tolyl)silylene-bis(2-methyl-4-phenyl-1-indenyl)zirconium dichloride,
rac-Di(p-chlorophenyl)silylene-bis(2-methyl-4-phenyl-1-indenyl)zirconium dichloride,
rac-Methylene-bis(2-methyl-4-phenyl-1-indenyl)zirconium dichloride,
rac-Ethylene-bis(2-methyl-4-phenyl-1-indenyl)zirconium dichloride,
rac-Dimethylgermylene-bis(2-methyl-4-phenyl-1-indenyl)zirconium dichloride,
rac-Dimethylstannylene-bis(2-methyl-4-phenyl-1-indenyl)zirconium dichloride,
rac-Dimethylsilylene-bis(2-methyl-4-phenyl-1-indenyl)zirconium dibromide,
rac-Dimethylsilylene-bis(2-methyl-4-phenyl-1-indenyl)zirconium dimethyl,
rac-Dimethylsilylene-bis(2-methyl-4-phenyl-1-indenyl)zirconium methylchloride,
rac-Dimethylsilylene-bis(2-methyl-4-phenyl-1-indenyl)zirconium chloride $SO_2Me$,
rac-Dimethylsilylene-bis(2-methyl-4-phenyl-1-indenyl) zirconium chloride $OSO_2Me$,
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl)}zirconium dichloride,
rac-Dimethylsilylene-bis{1-(2-ethyl-4-(2-methyl-1-naphthyl)indenyl)}zirconium dichloride,
rac-Dimethylsilylene-bis{1-(2-ethyl-4-(5-acenaphthyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Dimethylsilylene-bis{1-(2-ethyl-4-(o-methylphenyl)indenyl)}zirconium dichloride,
rac-Dimethylsilylene-bis{1-(2-ethyl-4-(m-methylphenyl)indenyl)}zirconium dichloride,
rac-Dimethylsilylene-bis{1-(2-ethyl-4-(p-methylphenyl)indenyl)}zirconium dichloride,
rac-Dimethylsilylene-bis{1-(2-ethyl-4-(2,3-dimethylphenyl)indenyl)}zirconium dichloride,
rac-Dimethylsilylene-bis{1-(2-ethyl-4-(2,4-dimethylphenyl)indenyl)}zirconium dichloride,
rac-Dimethylsilylene-bis{1-(2-ethyl-4-(2,5-dimethylphenyl)indenyl)}zirconium dichloride,
rac-Dimethylsilylene-bis{1-(2-ethyl-4-(2,4,6-trimethylphenyl)indenyl)}zirconium dichloride,
rac-Dimethylsilylene-bis{1-(2-ethyl-4-(o-chlorophenyl)indenyl)}zirconium dichloride,
rac-Dimethylsilylene-bis{1-(2-ethyl-4-(m-chlorophenyl)indenyl)}zirconium dichloride, rac-Dimethylsilylene-bis{1-(2-ethyl-4-(p-chlorophenyl)indenyl)}zirconium dichloride,
rac-Dimethylsilylene-bis{1-(2-ethyl-4-(2,3-dichlorophenyl)indenyl)}zirconium dichloride,
rac-Dimethylsilylene-bis{1-(2-ethyl-4-(2,6-dichlorophenyl)indenyl)}zirconium dichloride,
rac-Dimethylsilylene-bis{1-(2-ethyl-4-(3,5-dichlorophenyl)indenyl)}zirconium dichloride,
rac-Dimethylsilylene-bis{1-(2-ethyl-4-(2-bromophenyl)indenyl)}zirconium dichloride,
rac-Dimethylsilylene-bis{1-(2-ethyl-4-(3-bromophenyl)indenyl)}zirconium dichloride,
rac-Dimethylsilylene-bis{1-(2-ethyl-4-(4-bromophenyl)indenyl)}zirconium dichloride,
rac-Dimethylsilylene-bis{1-(2-ethyl-4-(4-biphenylyl)indenyl)}zirconium dichloride,
rac-Dimethylsilylene-bis{1-(2-ethyl-4-(4-trimethylsilylphenyl)indenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(β-naphthyl)indenyl)}zirconium dichloride,
rac-Dimethylsilylene-bis{1-(2-n-propyl-4-(2-methyl-1-naphthyl)indenyl)}zirconium dichloride,
rac-Dimethylsilylene-bis{1-(2-n-propyl-4-(5-acenaphthyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-propyl-4-phenylindenyl)}zirconium dichloride,
rac-Dimethylsilylene-bis{1-(2-i-propyl-4-(α-naphthyl)indenyl)}zirconium dichloride,
rac-Dimethylsilylene-bis{1-(2-i-propyl-4-(β-naphthyl)indenyl)}zirconium dichloride,
rac-Dimethylsilylene-bis{1-(2-i-propyl-4-(8-methyl-9-naphthyl)indenyl)}zirconium dichloride,
rac-Dimethylsilylene-bis{1-(2-i-propyl-4-(5-acenaphthyl)indenyl)}zirconium dichloride,
rac-Dimethylsilylene-bis{1-(2-i-propyl-4-(9-anthracenyl)indenyl)}zirconium dichloride,
rac-Dimethylsilylene-bis{1-(2-i-propyl-4-(9-phenanthryl)indenyl)}zirconium dichloride,
rac-Dimethylsilylene-bis{1-(2-s-butyl-4-phenylindenyl)}zirconium dichloride,
rac-Dimethylsilylene-bis{1-(2-s-butyl-4-(α-naphthyl)indenyl)}zirconium dichloride,
rac-Dimethylsilylene-bis{1-(2-s-butyl-4-(β-naphthyl)indenyl)}zirconium dichloride,
rac-Dimethylsilylene-bis{1-(2-s-butyl-4-(2-methyl-1-naphthyl)indenyl)}zirconium dichloride,
rac-Dimethylsilylene-bis{1-(2-s-butyl-4-(5-acenaphthyl)indenyl)}zirconium dichloride,
rac-Dimethylsilylene-bis{1-(2-s-butyl-4-(9-anthracenyl)indenyl)}zirconium dichloride,
rac-Dimethylsilylene-bis{1-(2-s-butyl-4-(9-phenanthryl)indenyl)}zirconium dichloride,
rac-Dimethylsilylene-bis{1-(2-n-pentyl-4-phenylindenyl)}zirconium dichloride,
rac-Dimethylsilylene-bis{1-(2-n-pentyl-4-(α-naphthyl)indenyl)}zirconium dichloride,
rac-Dimethylsilylene-bis{1-(2-n-butyl-4-phenylindenyl)}zirconium dichloride,
rac-Dimethylsilylene-bis{1-(2-n-butyl-4-(α-naphthyl)indenyl)}zirconium dichloride,
rac-Dimethylsilylene-bis{1-(2-n-butyl-4-(β-naphthyl)indenyl)}zirconium dichloride,
rac-Dimethylsilylene-bis{1-(2-n-butyl-4-(2-methyl-1-naphthyl)indenyl)}zirconium dichloride,
rac-Dimethylsilylene-bis{1-(2-n-butyl-4-(5-acenaphthyl)indenyl)}zirconium dichloride,
rac-Dimethylsilylene-bis{1-(2-n-butyl-4-(9-anthracenyl)indenyl)}zirconium dichloride,
rac-Dimethylsilylene-bis{1-(2-n-butyl-4-(9-phenanthryl)indenyl)}zirconium dichloride,
rac-Dimethylsilylene-bis{1-(2-i-butyl-4-phenylindenyl)}zirconium dichloride,
rac-Dimethylsilylene-bis{1-(2-i-butyl-4-(α-naphthyl)indenyl)}zirconium dichloride,
rac-Dimethylsilylene-bis{1-(2-i-butyl-4-(β-naphthyl)indenyl)}zirconium dichloride,
rac-Dimethylsilylene-bis{1-(2-i-butyl-4-(2-methyl-1-naphthyl)indenyl)}zirconium dichloride,
rac-Dimethylsilylene-bis{1-(2-i-butyl-4-(5-acenaphthyl)indenyl)}zirconium dichloride,
rac-Dimethylsilylene-bis{1-(2-i-butyl-4-(9-anthracenyl)indenyl)}zirconium dichloride,
rac-Dimethylsilylene-bis{1-(2-i-butyl-4-(9-phenanthryl)indenyl)}zirconium dichloride,
rac-Dimethylsilylene-bis{1-(2-neopentyl-4-phenylindenyl)}zirconium dichloride,
rac-Dimethylsilylene-bis{1-(2-neopentyl-4-(α-naphthyl)indenyl)}zirconium dichloride,
rac-Dimethylsilylene-bis{1-(2-n-hexyl-4-phenylindenyl)}zirconium dichloride,
rac-Dimethylsilylene-bis{1-(2-n-hexyl-4-(α-naphthyl)indenyl)}zirconium dichloride,
rac-Methylphenylsilylene-bis{1-(2-ethyl-4-phenylindenyl)}zirconium dichloride,
rac-Methylphenylsilylene-bis{1-(2-ethyl-4-(α-naphthyl)indenyl)}zirconium dichloride,
rac-Methylphenylsilylene-bis{1-(2-ethyl-4-(9-anthracenyl)indenyl)}zirconium dichloride,
rac-Methylphenylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Diphenylsilylene-bis{1-(2-ethyl-4-(α-naphthyl)indenyl)}zirconium dichloride,
rac-Diphenylsilylene-bis{1-(2-ethyl-4-(9-anthracenyl)indenyl)}zirconium dichloride,
rac-Diphenylsilylene-bis{1-(2-ethyl-4-(9-phenanthryl)indenyl)}zirconium dichloride,
rac-Diphenylsilylene-bis{1-(2-ethyl-4-(4-biphenylyl)indenyl)}zirconium dichloride,
rac-Methylene-bis{1-(2-ethyl-4-phenylindenyl)}zirconium dichloride,
rac-Methylene-bis{1-(2-ethyl-4-(α-naphthyl)indenyl)}zirconium dichloride,
rac-Ethylene-bis{1-(2-ethyl-4-phenylindenyl)}zirconium dichloride,
rac-Ethylene-bis{1-(2-ethyl-4-(α-naphthyl)indenyl)}zirconium dichloride,
rac-Ethylene-{1-(2-n-propyl-4-(α-naphthyl)indenyl)}zirconium dichloride,
rac-Dimethylgermyl-bis{1-(2-ethyl-4-phenylindenyl)}zirconium dichloride,
rac-Dimethylgermyl-bis{1-(2-ethyl-4-(α-naphthyl)indenyl)}zirconium dichloride, and
rac-Dimethylgermyl-bis{1-(2-n-propyl-4-phenylindenyl)}zirconium dichloride.

Also employable are compounds wherein zirconium is replaced with titanium or hafnium in the above-exemplified compounds.

In the invention, a racemic modification of the metallocene compound is generally used as the catalyst component, but R type or S type is also employable.

The metallocene compounds mentioned above can be used in combination of two or more kinds.

The metallocene compounds can be prepared in accordance with "Journal of Organometallic Chem.", 288 (1985), pp. 63–67 and European Patent Application No. 0,320,762.

Other than the metallocene compound of the formula [II], a compound represented by the following formula [III] is also employable.

$$L^aMX_2 \quad [III]$$

wherein M is a metal of Group IV of the periodic table or a metal of lanthanide series;

$L^a$ is a derivative of delocalization π bond group and imparts restraint geometrical shape to the metal M active site; and Xs are each independently hydrogen, a halogen atom, a hydrocarbon group containing 20 or less carbon atoms, silicon or germanium, a silyl group or a germyl group.

Of the compounds of the formula [III], preferable are those represented by the following formula [III-a].

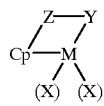

[III-a]

In the formula [III-a], M is titanium, zirconium or hafnium, and X is the same as described above.

Cp is π-bonded to M and is a substituted cyclopentadienyl group having a substituent Z or its derivative.

Z is oxygen, sulfur, boron or an element of Group IVA of the periodic table (for example, silicon, germanium or tin).

Y is a ligand containing nitrogen, phosphorus, oxygen or sulfur.

Z and Y may together form a condensed ring.

Listed below are examples of the compounds represented by the formula [III-a].

(Dimethyl(t-butylamide)(tetramethyl-$\eta^5$-cyclopentadienyl)silane)titanium dichloride,
((t-Butylamide)(tetramethyl-$\eta^5$-cyclopentadienyl)-1,2-ethanediyl)titanium dichloride,
(Dibenzyl(t-butylamide)(tetramethyl-$\eta^5$-cyclopentadienyl)silane)titanium dichloride,
(Dimethyl(t-butylamide)(tetramethyl-$\eta^5$-cyclopentadienyl)silane)dibenzyltitanium,
(Dimethyl(t-butylamide)(tetramethyl-$\eta^5$-cyclopentadienyl)silane)dimethyltitanium,
((t-Butylamide)(tetramethyl-$\eta^5$-cyclopentadienyl)-1,2-ethanediyl)dibenzyltitanium,
((Methylamide)(tetramethyl-$\eta^5$-cyclopentadienyl)-1,2-ethanediyl)dineopentyltitanium,
((Phenylphosphide)(tetramethyl-$\eta^5$-cyclopentadienyl)methylene)diphenyltitanium,
(Dibenzyl(t-butylamide)(tetramethyl-$\eta^5$-cyclopentadienyl)silane)dibenzyltitanium,
(Dimethyl(benzylamide)($\eta^5$-cyclopentadienyl)silane)di(trimethylsilyl)titanium,
(Dimethyl(phenylphosphide)-(tetramethyl-$\eta^5$-cyclopentadienyl)silane)dibenzyltitanium,
(Tetramethyl-$\eta^5$-cyclopentadienyl) -1,2-ethanediyl) dibenzyltitanium,
(2-$\eta^5$-(Tetramethyl-cyclopentadienyl)-1-methyl-ethanolate (2-))dibenzyltitanium,
(2-$\eta^5$-(Tetramethyl-cyclopentadienyl)-1-methyl-ethanolate (2-))dimethyltitanium,
(2-((4a,4b,8a,9,9a-$\eta$)-9H-Fluorene-9-yl)cyclohexanolate (2-))dimethyltitanium, and
(2-((4a,4b,8a,9,9a-$\eta$)-9H-Fluorene-9-yl)cyclohexanolate (2-))dibenzyltitanium.

In the invention, the metallocene compounds represented by the formula [III] can be used in combination of two or more kinds.

Some of titanium compounds are listed above as examples of the metallocene compounds, but compounds wherein titanium is replaced with zirconium or hafnium in the above-exemplified titanium compounds are also employable.

These compounds may be used alone or in combination of two or more kinds.

Of the above-mentioned various metallocene compounds, the metallocene compound represented by the formula [II] is preferably used in the preparation of the long-chain branched ethylene/α-olefin copolymer rubber.

Organoaluminum oxy-compound [b]

The organoaluminum oxy-compound [b] used in the invention may be aluminoxane conventionally known or a benzene-insoluble organoaluminum oxy-compound exemplified in Japanese Patent Laid-Open Publication No. 78687/1990.

The conventionally known aluminoxane can be prepared by, for example, the following procedures.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the compound or the salt, followed by recovering aluminoxane as its hydrocarbon solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminooxane may contain a small amount of an organometallic component. Further, it is possible that the solvent or the unreacted organoaluminum compound is distilled off from the recovered solution of aluminooxane and that the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferable are trialkylaluminums and tricycloalkylaluminums.

Also employable as the organoaluminum compound used for preparing the aluminoxane is isoprenylaluminum represented by the formula $(i\text{-}C_4H_9)_xAl_y(C_5H_{10})_z$ (wherein x, y, z are each a positive number, and $z \geq 2x$).

The organoaluminum compounds mentioned above can be used in combination of two or more kinds.

Examples of the solvents used for preparing the aluminoxane include:

aromatic hydrocarbons, such as benzene, toluene, xylene, cumene and cymene;

aliphatic hydrocarbons, such as pentane, hexane, heptane, octane, decane, dodecane, hexadecane and octadecane;

alicyclic hydrocarbons, such as cyclopentane, cyclohexane, cyclooctane and methylcyclopentane;

petroleum fractions, such as gasoline, kerosine and gas oil; and halides of these aromatic, aliphatic and alicyclic hydrocarbons, particularly chlorides and bromides thereof.

Also employable are ethers such as ethyl ether and tetrahydrofuran.

Of the solvents, particularly preferable are aromatic hydrocarbons.

Compound [c] which reacts with the metallocene compound [a] to form an ion pair

The compound [c] which reacts with the metallocene compound [a] to form an ion pair includes Lewis acid, ionic compounds, borane compounds and carborane compounds described in National Publications of international Patent No. 501950/1989 and No. 502036/1989, Japanese Patent Laid-Open Publication No. 179005/1991, No. 179006/1991, No. 207703/1991 and No. 207704/1991, and U.S. Pat. No. 5,321,106.

The Lewis acid includes Mg-containing Lewis acid, Al-containing Lewis acid and B-containing Lewis acid. Of these, B-containing Lewis acid is preferred.

The Lewis acid which contains a boron atom is, for example, a compound represented by the following formula:

$BR^1R^2R^3$ wherein $R^1$, $R^2$ and $R^3$ are each independently a phenyl group which may have a substituent such as fluorine, methyl or trifluoromethyl, or a fluorine atom.

Examples of the compounds represented by the above formula include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron. Of these, particularly preferred is tris(pentafluorophenyl)boron.

The ionic compound employable in the invention is a sale comprising a cationic compound and an anionic compound. The anion reacts with the metallocene compound [a] to render the compound [a] cationic and to form an ion pair, thereby to stabilize the transition metal cation seed. Examples of such anions include organoboron compound anion, organoarsenic compound anion and organoaluminum compound anion. Preferable are anions which are relatively bulky and stabilize the transition metal cation seed. Examples of the cations include metallic cation, organometallic cation, carbonium cation, tripium cation, oxonium cation, sulfonium cation, phosphonium cation and ammonium cation. More specifically, there can be mentioned triphenylcarbenium cation, tributylammonium cation, N,N-dimethylammonium cation, ferroceniur cation, etc.

In the invention, ionic compounds containing an organoboron compound anion are preferred, and examples thereof include:

trialkyl-substituted ammonium salts, such as triethylammoniumtetra(phenyl)boron, tripropylammoniumtetra(phenyl)boron, tri(n-butyl) ammoniumtetra (phenyl)boron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-trifluoromethylphenyl)boron, tri(n-butyl)ammoniumtetra(o-tolyl)boron and tri(n-butyl)ammoniumtetra (4-fluorophenyl)boron;

N,N,-dialkylanilinium salts, such as N,N-dimethylaniliniumtetra(phenyl) boron, N,N-diethylaniliniumtetra(phenyl)boron and N,N-2,4,6-pentamethylaniliniumtetra(phenyl)boron;

dialkylammonium salts, such as di(n-propyl) ammoniumtetra(pentafluorophenyl)boron and dicyclohexylammoniumtetra(phenyl)boron; and triarylphosphonium salts, such as triphenylphosphoniumtetra(phenyl)boron, tri (methylphenyl)phosphoniumtetra(phenyl)boron and tri (dimethylphenyl)phosphoniumtetra(phenyl)boron.

As the ionic compounds containing a boron atom, triphenylcarbeniumtetrakis(pentafluorophenyl)borate, N,N-dimethylaniliniumtetrakis(pentafluorophenyl)borate and ferroceniumtetrakis(pentafluorophenyl)borate are also employable in the invention.

Further, the following ionic compounds containing a boron atom are also employable. (In the ionic compounds enumerated below, the counter ion is tri(n-butyl)ammonium, but the counter ion is in no way limited thereto.) That is, there can be mentioned salts of anion, for example, bis[tri (n-butyl)ammonium]nonaborate, bis[tri(n-butyl) ammonium]decaborate, bis[tri(n-butyl)ammonium, undecaborate, bis[tri(n-butyl)ammonium]dodecaborate, bis [tri(n-butyl)ammonium]decachlorodecaborate, bis[tri(n-butyl)ammonium]dodecachlorododecaborate, tri(n-butyl) ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate and tri(n-butyl)ammoniumbromo-1-carbadodecaborate.

Moreover, borane compounds and carborane compounds are also employable. These compounds are used as the Lewis acid or the ionic compounds.

Examples of borane compounds, carborane complex compounds and salts of carborane anions include decaborane (14), 7,8-dicarbaundecaborane(13), 2,7-dicarbaundecaborane(13), undecahydride-7,8-dimethyl-7,8-dicarbaundecaborane, dodecahydride-11-methyl-2,7-dicarbaundecaborane, tri(n-butyl)ammonium-6-carbadecaborate(14), tri(n-butyl)ammonium-6-carbadecaborate(12), tri(n-butyl)ammonium-7- carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydride-8-methyl-7,9-dicarbaundecaborate, tri(n-butyl)ammoniumundecahydride-8-ethyl-7,9-dicarbaundecaborate, tri(n-butyl)ammoniumundecahydride-8-butyl-7,9-dicarbaundecaborate, tri(n-butyl)ammoniumundecahydride-8-allyl-7,9-dicarbaundecaborate, tri(n-butyl)ammoniumundecahydride-9-trimethylsilyl-7,8-dicarbaundecaborate and tri(n-butyl)ammoniumundecahydride-4,6-dibromo-7-carbaundecaborate.

Examples of carborane compounds and salts of carboranes include 4-carbanonaborane(14), 1,3-dicarbanonaborane(13), 6,9-dicarbadecaborane(14), dodecahydride-1-phenyl-1,3-dicarbanonaborane, dodecahydride-1-methyl-1,3-dicarbanonaborane and undecahydride-1,3-dimethyl-1,3-dicarbanonaborane.

Furthermore, the following compounds are also employable. (In the ionic compounds enumerated below, the counter ion is tri(n-butyl)ammonium, but the counter ion is in no way limited thereto.)

That is, there can be mentioned salts of metallic carboranes and metallic borane anions, for example, tri(n-butyl)ammoniumbis(nonahydride-1,3-dicarbanonaborate)cobaltate(III), tri(n-butyl)ammoniumbis(undecahydride-7,8-dicarbaundecaborate)ferrate(III), tri(n-butyl)ammoniumbis(undecahydride-7,8-dicarbaundecaborate)cobaltate(III), tri(n-butyl)ammoniumbis(undecahydride-7,8-dicarbaundecaborate)nickelate(III), tri(n-butyl)ammoniumbis(undecahydride-7,8-dicarbaundecaborate)cuprate(III), tri(n-butyl)ammoniumbis(undecahydride-7,8-dicarbaundecaborate)aurate(III), tri(n-butyl)ammoniumbis(nonahydride-7,8-dimethyl-7,8-dicarbaundecaborate)ferrate(III), tri(n-butyl)ammoniumbis(nonahydride-7,8-dimethyl-7,8-dicarbaundecaborate)chromate(III), tri(n-butyl)ammoniumbis(tribromooctahydride-7,8-dicarbaundecaborate)cobaltate(III), tri(n-butyl)ammoniumbis(dodecahydridedicarbadodecaborate)-cobaltate(III), bis[tri(n-butyl)ammonium]bis(dodecahydridedodecaborate)-nickelate(III), tris(tri(n-butyl)ammonium]bis(undecahydride-7-carbaundecaborate)chromate(III), bis[tri(n-butyl)ammonium]bis(undecahydride-7-carbaundecaborate)manganate(IV), bis[tri(n-butyl)ammonium]bis(undecahydride-7-carbaundecaborate)cobaltate(III) and bis[tri(n-butyl)ammonium]bis(undecahydride-7-carbaundecaborate)nickelate(IV).

The compounds [c] mentioned above can be used singly or in combination of two or more kinds.

Organoaluminum compound [d]

The organoaluminum compound [d] used in the invention can be represented by, for example, the following general formula (a):

$$R^5{}_n AlX_{3-n} \tag{a}$$

wherein $R^5$ is a hydrocarbon group of 1 to 12 carbon atoms, X is a halogen atom or hydrogen, and n is 1 to 3.

In the formula (a), $R^5$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound [d] is a compound represented by the following formula (b):

$$R^5{}_n AlY_{3-n} \tag{b}$$

wherein $R^5$ is the same as $R^5$ in the formula (a); Y is —$OR^6$ group, —$OSiR^7{}_3$ group, —$OAlR^8{}_2$ group, —$NR^9{}_2$ group, —$SiR^{10}{}_3$ group or —$N(R^{11})AlR^{12}{}_2$ group; n is 1 to 2; $R^6$, $R^7$, $R^8$ and $R^{12}$ are each methyl, ethyl, isopropyl, isobutyl, cyclohexyl, phenyl or the like; $R^9$ is hydrogen, methyl, ethyl, isopropyl, phenyl, trimethylsilyl or the like; and $R^{10}$ and $R^{11}$ are each methyl, ethyl or the like.

Examples of such organoaluminum compounds include:

(i) compounds of the formula $R^5{}_n Al(OR^6)_{3-n}$, e.g., dimethylaluminum methoxide, diethylaluminum ethoxide and diisobutylaluminum methoxide;

(ii) compounds of the formula $R^5{}_n Al(OSiR^7{}_3)_{3-n}$, e.g., $(C_2H_5)_2Al(OSi(CH_3)_3)$, $(iso\text{-}C_4H_9)_2Al(OSi(CH_3)_3)$ and $(iso\text{-}C_4H_9)_2Al(OSiC_2H_5)_3)$;

(iii) compounds of the formula $R^5{}_n Al(OAlR^8{}_2)_{3-n}$, e.g., $(C_2H_5)_2Al(OAl(C_2H_5)_2)$ and $(iso\text{-}C_4H_9)_2Al(OAl(iso\text{-}C_4H_9)_2)$;

(iv) compounds of the formula $R^5{}_n Al(NR^9{}_2)_{3-n}$, e.g., $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$ and $(iso\text{-}C_4H_9)_2Al[N(Si(CH_3)_3)_2]$; and (v) compounds of the formula $R^5{}_n Al(SiR^{10}{}_3)_{3-n}$, e.g., $(iso\text{-}C_4H_9)_2Al(Si(CH_3)_3)$.

Of these, preferable are organoaluminum compounds of the formulae $R^5{}_3Al$, $R^5{}_n Al(OR^6)_{3-n}$ and $R^5{}_n Al(OAlR^8{}_2)_{3-n}$, and particularly preferred are compounds of said formulae wherein $R^5$ is an isoalkyl group and n is 2. The organoaluminum compounds mentioned above can be used in combination of two or more kinds.

The specific metallocene catalyst employable in the invention contains the metallocene compound [a], and the catalyst can be formed from, for example, the metallocene compound [a] and the organoaluminum oxy-compound [b] as mentioned above. The metallocene catalyst may be formed from the metallocene compound [a] and the compound [c] which reacts with the compound [a] to form an ion pair, or it may be formed from the metallocene compound [a], the organoaluminum oxy-compound [b] and the compound [c] which forms an ion pair. In these embodiments, it is particularly preferable to further use the organoaluminum compound [d] in combination.

In the present invention, the metallocene compound [a] is used in an amount of usually about 0.00005 to 0.1 mmol, preferably about 0.0001 to 0.05 mmol, in terms of the transition metal atom, based on 1 liter of the polymerization volume.

The organoaluminum oxy-compound [b] is used in such an amount that the amount of the aluminum atom becomes usually about 1 to 10,000 mol, preferably 10 to 5,000 mol, per 1 mol of the transition metal atom.

The compound [c] which reacts with the metallocene compound [a] to form an ion pair is used in such an amount that the amount of the boron atom becomes usually about 0.5 to 20 mol, preferably 1 to 10 mol, based on 1 mol of the transition metal atom.

The organoaluminum compound [d] is used optionally in an amount of usually about 0 to 1,000 mol, preferably about 0 to 500 mol, based on 1 mol of the aluminum atom in the organoaluminum oxy-compound [b] or the boron atom in the compound [c] which forms an ion pair.

When ethylene and the α-olefin of 6 to 20 carbon atoms are copolymerized using such a metallocene catalyst as mentioned above, a linear or long-chain branched ethylene/α-olefin random copolymer can be obtained with high polymerization activities.

However, even if ethylene and the α-olefin of 6 to 20 carbon atoms are copolymerized using a Group VB transition metal compound catalyst such as a vanadium catalyst, a linear or long-chain branched ethylene/α-olefin random copolymer cannot be obtained with sufficient polymerization activities.

In the copolymerization of ethylene and the α-olefin of 6 to 20 carbon atoms, the metallocene compound [a], the organoaluminum oxy-compound [b] and the ion pair-forming compound [c], and optionally, the organoaluminum compound [d], all of which constitute the metallocene catalyst, may be separately fed to the polymerization reactor, or a preliminarily prepared metallocene catalyst containing the metallocene compound [a] may be added to the polymerization reaction system.

In the preparation of the metallocene catalyst, hydrocarbon solvents which are inert to the catalyst components can be employed. Examples of the inert hydrocarbon solvents include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These hydrocarbon solvents can be used singly or in combination.

The metallocene compound [a], the organoaluminum oxy-compound [b], the ion pair-forming compound [c] and the organoaluminum compound [d] can be contacted at a temperature of usually −100 to 200° C., preferably −70 to 100° C.

In the present invention, copolymerization of ethylene and the α-olefin of 6 to 20 carbon atoms can be carried out under the conditions of a temperature of usually 40 to 200° C., preferably 50 to 150° C., particularly preferably 60 to 120° C., and a pressure of atmospheric pressure to 100 kg/cm$^2$, preferably atmospheric pressure to 50 kg/cm$^2$, particularly preferably atmospheric pressure to 30 kg/cm$^2$.

The copolymerization reaction can be conducted by various polymerization processes, but it is preferably conducted by a solution polymerization process. In the solution polymerization process, the aforesaid hydrocarbon solvents are employable as the polymerization solvents.

Though the copolymerization can be carried out by any of batchwise, semi-continuous and continuous processes, it is preferably carried out continuously. The polymerization can be carried out in two or more stages, each of which is conducted under different reaction conditions.

The linear and long-chain branched ethylene/α-olefin random copolymers which are preferably used in the invention are obtained by the process mentioned above, and the molecular weight of these copolymers can be modified by controlling the polymerization conditions such as polymerization temperature or controlling the amount of hydrogen (molecular weight modifier).

Graft-modified ethylene/α-olefin random copolymer

As described above, the graft-modified ethylene/α-olefin random copolymer (B) used in the invention is obtained by graft-modifying the above-described unmodified ethylene/α-olefin random copolymer with a specific amount of an unsaturated carboxylic acid or its derivative.

The graft quantity of the unsaturated carboxylic acid or its derivative in the graft-modified ethylene/α-olefin random copolymer (B) is in the range of 0.01 to 10% by weight, preferably 0.1 to 5% by weight, based on 100% by weight of the unmodified ethylene/α-olefin random copolymer.

The graft-modified ethylene/α-olefin random copolymer (B) having a graft quantity within the above range exhibits high dispersibility in the polyamide resin composition, and besides it has excellent heat stability, so that the resin is not colored when melted. Moreover, when this graft-modified ethylene/α-olefin random copolymer (B) is used, a polyamide resin composition capable of providing molded products of high mechanical strength can be obtained.

Examples of the unsaturated carboxylic acids employable herein include acrylic acid, maleic acid, fumaric acid, tetrahydrophthalic acid, itaconic acid, citraconic acid, crotonic acid, isocrotonic acid and Nadic acid™ (endocis-bicyclo[2, 2,1]hepto-5-ene-2,3-dicarboxylic acid).

Examples of the derivatives of unsaturated carboxylic acids include acid halide compounds, amide compounds, imide compounds, acid anhydrides and ester compounds of the above-mentioned unsaturated carboxylic acids. More specifically, there can be mentioned malenyl chloride, maleimide, maleic anhydride, citraconic anhydride, monomethyl maleate, dimethyl maleate and glycidyl maleate. Of these, preferable are unsaturated carboxylic acids and anhydrides thereof, and particularly preferable are maleic acid, Nadic acid™ and anhydrides of these acids.

There is no specific limitation on the position of the unmodified ethylene/α-olefin random copolymer, at which the copolymer is grafted with the unsaturated carboxylic acid or its derivative, and it is enough that the unsaturated carboxylic acid or its derivative is bonded to an arbitrary carbon atom of the ethylene/α-olefin random copolymer for forming the graft-modified ethylene/α-olefin random copolymer (B).

The graft-modified ethylene/α-olefin random copolymer (B) can be prepared by various processes conventionally known, for example, the following processes.

(1) Melting the unmodified ethylene/α-olefin random copolymer, to the molten copolymer is added the unsaturated carboxylic acid or its derivative to perform graft copolymerization.

(2) Dissolving the unmodified ethylene/α-olefin random copolymer in a solvent, to the obtained solution is added the unsaturated carboxylic acid or its derivative to perform graft copolymerization.

In any of the above processes, the graft reaction is preferably carried out in the presence of a radical initiator to efficiently graft copolymerize graft monomers such as the unsaturated carboxylic acid.

Examples of the radical initiators include organic peroxides and azo compounds. More specifically, there can be mentioned:

organic peroxides, such as benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate; and azo compounds, such as azobisisobutyronitrile and dimethylazoisobutyrate.

Of these, preferably used are dialkyl peroxides such as dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The radical initiator is used in an amount of usually 0.001 to 1 part by weight, preferably 0.003 to 0.5 part by weight, more preferably 0.05 to 0.3 part by weight, based on 100 parts by weight of the unmodified ethylene/α-olefin random copolymer.

The graft reaction using or not using the radical initiator is carried out at a temperature of usually 60 to 350° C., preferably 150 to 300° C.

In the present invention, the graft-modified ethylene/α-olefin random copolymer (B) is used in an amount of 5 to 200 parts by weight, preferably 10 to 100 parts by weight, more preferably 10 to 60 parts by weight, based on 100 parts by weight of the polyamide resin (A).

When the graft-modified ethylene/α-olefin random copolymer (B) is used in the above-mentioned amount, a polyamide resin composition having good moldability and capable of providing molded products of excellent flexibility, low-temperature impact resistance, resistance to water-absorption and resistance to saline solutions can be obtained.

Other additives

To the polyamide resin composition of the invention comprising the polyamide resin (A) and the graft-modified ethylene/α-olefin random copolymer (B), various additives such as antioxidant, ultraviolet light absorber, light-protective agent, phosphite stabilizer, peroxide decomposer, basic co-stabilizer, nucleating agent, plasticizer, lubricant, antistatic agent, flame retardant, pigment, dye and filler can be optionally added within limits not prejudicial to the object of the invention. Further, other polymers may be added to the polyamide resin composition of the invention, within limits not prejudicial to the object of the invention.

Examples of the fillers include carbon black, asbestos, talc, silica and silica alumina.

Preparation of polyamide resin composition

The polyamide resin composition of the invention can be prepared by melt mixing the polyamide resin (A), the graft-modified ethylene/α-olefin random copolymer (B), and optionally, additives, by various methods conventionally, known.

That is, the polyamide resin composition of the invention can be obtained by simultaneously or successively introducing the above components into a mixing device such as Henschel mixer, V-type blender, tumbling mixer or ribbon blender to mix them in the device and then melt kneading the mixture thus obtained by a kneading device such as single-screw extruder, multi-screw extruder, kneader or Banbury mixer.

Of the kneading devices, those of good kneading performance such as multi-screw extruder, kneader and Banbury mixer are preferably used, whereby a polyamide resin composition of high quality wherein the components are homogeneously dispersed can be obtained.

In any of the stages, the above-mentioned additives, e.g., antioxidant, can be optionally added.

The polyamide resin composition of the invention obtained as above can be molded into various shapes by various melt molding methods conventionally known such as injection molding, extrusion molding and compression molding.

EFFECT OF THE INVENTION

The polyamide resin composition of the invention comprises a specific amount of the polyamide resin (A) and a specific amount of the graft-modified ethylene/α-olefin random copolymer (B) which is obtained by graft-modifying an ethylene/α-olefin random copolymer of ethylene and an α-olefin of 6 to 20 carbon atoms with an unsaturated carboxylic acid or its derivative and has a graft quantity of 0.01 to 10% by weight. The graft-modified ethylene/α-olefin random copolymer (B) is a graft-modified product of an ethylene/α-olefin random copolymer having a specific α-olefin content and a specific intrinsic viscosity. Hence, the polyamide resin composition of the invention has excellent melt flowability, i.e., excellent moldability, and a capability of providing molded products of excellent flexibility, low-temperature impact resistance, resistance to water absorption and resistance to saline solutions.

EXAMPLE

The present invention will be further described with reference to the following examples, but it should be construed that the invention is in no way limited to those examples.

Example 1

Preparation of ethylene/1-octene random copolymer

Preparation of catalyst solution

To a glass flask thoroughly purged with nitrogen, 0.5 mg of bis(1,3-dimethylcyclopentadienyl)zirconium dichloride was introduced. To the flask were then added 1.57 ml of a toluene solution of methylaluminooxane (Al: 1.1 mol/l) and 2.76 ml of toluene to obtain a catalyst solution.

Polymerization

To a 2 liter stainless steel autoclave thoroughly purged with nitrogen, 600 ml of hexane and 300 ml of 1-octene were introduced, and the temperature of the system was elevated to 60° C. Then, 1 mmol of triisobutylaluminum and 0.5 ml (0.001 mmol in terms of Zr) of the catalyst solution prepared above were injected into the autoclave together with ethylene to initiate polymerization. Thereafter, only ethylene was continuously fed to maintain the total pressure at 3.0 kg/cm²-G, and the polymerization was continued at 70° C. for 60 minutes. After a small amount of ethanol was fed to the system to terminate the polymerization, the unreacted ethylene was purged out. The reaction solution was introduced into a large excess of methanol to precipitate a polymer. The polymer was separated by filtration and dried overnight under reduced pressure to obtain a linear ethylene/ 1-octene random copolymer.

The copolymer thus obtained had a 1-octene content of 17% by mol, an intrinsic viscosity ($\eta$), as measured in decalin at 135° C., of 2.2 dl/g, a glass transition temperature (Tg) of −60° C., a crystallinity, as measured by X-ray diffractometry, of 2%, a molecular weight distribution (Mw/Mn), as determined by GPC, of 2.5, a B value of 1.1, and a g$\eta$* value of 1.0.

Preparation of maleic anhydride graft-modified ethylene/1-octene random copolymer In a Henschel mixer, 10 kg of the linear ethylene/1-octene random copolymer was blended with a solution obtained by dissolving 50 g of maleic anhydride and 3 g of di-tert-butyl peroxide in 30 g of acetone.

Then, the blend obtained above was fed to a single-screw extruder having a screw diameter of 40 mm and L/D of 26 through a hopper and extruded into strands under the conditions of a resin temperature of 280° C. and an extrusion rate of 6 kg/hr. The strands were cooled with water and then pelletized to obtain a maleic anhydride graft-modified ethylene/1-octene random copolymer.

From the graft-modified ethylene/1-octene random copolymer, the unreacted maleic anhydride was extracted with acetone. Then, a graft quantity of the maleic anhydride in the graft-modified ethylene/1-octene random copolymer was measured. As a result, the graft quantity was 0.48% by weight.

Preparation of polyamide resin composition

100 Parts by weight of nylon 6 (Amilan CM1017, available from Toray Industries, Inc., MFR (235° C., load of 2.16 kg): 33 g/10 min) and 25 parts by weight of the maleic anhydride graft-modified ethylene/1-octene random copolymer pellets were blended by means of a Henschel mixer to prepare a dry blend.

Then, the dry blend was fed to a twin-screw extruder (L/D=40, diameter: 30 mm) preset at 245° C. to prepare pellets of a polyamide resin composition.

The pellets of the polyamide resin composition was dried at 80° C. for 24 hours and subjected to injection molding under the following conditions to prepare specimens for property tests.
Injection molding conditions
  Cylinder temperature: 245° C.
  Injection pressure: 400 kg/cm$^2$
  Mold temperature: 80° C.

Subsequently, properties of the polyamide resin composition were evaluated by the following methods.

(1) Flexural test

A flexural modulus (FM, kg/cm$^2$) of a specimen having a thickness of 1/8 inch was measured in accordance with ASTM D 790. Conditioning of the specimen was carried out at 23° C. for 2 days in a dry state.

(2) Izod impact test

A notched Izod impact strength of a specimen having a thickness of 1/8 inch was measured at −40° C. in accordance with ASTM D 256. Conditioning of the specimen was carried out at 23° C. for 2 days in a dry state.

The results are set forth in Table 1.

Example 2

A polyamide resin composition was prepared in the same manner as in Example 1 except that the amount of the maleic anhydride graft-modified ethylene/1-octene random copolymer was varied to 100 parts by weight. The flexural modulus and the notched impact strength of the polyamide resin composition were measured by the methods previously described.

The results are set forth in Table 1.

Example 3

A catalyst solution was prepared in the same manner as in Example 1 except that rac-dimethylsilylene-bis{1-(2-methyl-4-phenylindenyl)}zirconium dichloride was used in place of bis(1,3-dimethylcyclopentadienyl)zirconium dichloride. Using this catalyst solution, a long-chain branched ethylene/1-octene random copolymer was prepared in the same manner as in Example 1.

The copolymer thus obtained had a 1-octene content of 17% by mol, an intrinsic viscosity ($\eta$), as measured in decalin at 135° C., of 1.9 dl/g, a glass transition temperature of −60° C., a crystallinity, as measured by X-ray diffractometry, of 2%, a molecular weight distribution (Mw/Mn), as determined by GPC, of 2.5, a B value of 1.0, and a g$\eta$* value of 0.86.

The long-chain branched ethylene/1-octene random copolymer was graft-modified with maleic anhydride in the same manner as in Example 1 to obtain a graft-modified ethylene/1-octene random copolymer.

Using the graft-modified ethylene/1-octene random copolymer, pellets of a polyamide resin composition were prepared in the same manner as in Example 1. The flexural modulus and the notched Izod impact strength of the polyamide resin composition were measured by the methods previously described.

The results are set forth in Table 1.

Comparative Example 1

Preparation of ethylene/1-butene random copolymer

In a polymerization reactor, vanadium oxytrichloride and ethylaluminum sesquichloride were employed as a polymerization catalyst, a mixed gas of ethylene and 1-butene and a hydrogen gas were fed to hexane serving as a polymerization solvent, and polymerization of ethylene and 1-butene was continuously carried out under the conditions of a temperature of 40° C., a pressure of 5 kg/cm$^2$ and a residence time of 1 hour. From the reaction solution, the solvent was separated to obtain an ethylene/1-butene random copolymer as the aimed product.

The copolymer thus obtained had a 1-butene content of 19% by mol, an intrinsic viscosity ($\eta$), as measured in decalin at 135° C., of 2.2 dl/g, a glass transition temperature of −65° C., a crystallinity, as measured by X-ray diffractometry, of 2% and a B value of 1.1.

Preparation of maleic anhydride graft-modified ethylene/1-butene random copolymer In a Henschel mixer, 10 kg of the ethylene/1-butene random copolymer was blended with a solution obtained by dissolving 50 g of maleic anhydride and 3 g of di-tert-butyl peroxide in 50 g of acetone.

Then, the blend obtained above was fed to a single-screw extruder having a screw diameter of 40 mm and L/D of 26 through a hopper and extruded into strands under the conditions of a resin temperature of 260° C. and an extrusion rate of 6 kg/hr. The strands were cooled with water and then pelletized to obtain a maleic anhydride graft-modified ethylene/1-butene random copolymer.

From the solution of the graft-modified ethylene/1-butene random copolymer, the unreacted maleic anhydride was extracted with acetone. Then, a graft quantity of the maleic anhydride in the graft-modified ethylene/1-butene random copolymer was measured. As a result, the graft quantity was 0.43% by weight.

Preparation of polyamide resin composition

100 Parts by weight of nylon 6 (Amilan CM1017, available from Toray Industries, Inc., MFR (235° C., load of 2.16 kg): 33 g/10 min) and 25 parts by weight of the maleic anhydride graft-modified ethylene/1-butene random copolymer pellets were blended by means of a Henschel mixer to prepare a dry blend.

Then, the dry blend was fed to a twin-screw extruder (L/D=40, diameter: 30 mm) preset at 245° C. to prepare pellets of a polyamide resin composition.

The pellets of the polyamide resin composition was dried at 80° C. for 24 hours and subjected to injection molding under the following conditions to prepare specimens for property tests. With respect to the spiral flow, the polyamide resin composition was injected into a half-round mold (diameter: 3.8 mm) provided with spiral grooves under the following conditions and the flow distance was measured.

Injection molding conditions

Cylinder temperature: 245° C.

Injection pressure: 1,000 kg/cm²

Mold temperature: 80° C.

Then, using the specimens obtained above, the flexural modulus and the notched Izod impact strength were measured by the methods previously described.

The results are set forth in Table 1.

TABLE 1

|  | Unit | Ex. 1 | Ex. 2 | Ex. 3 | Comp. Ex. 1 |
|---|---|---|---|---|---|
| Ethylene/α-olefin random copolymer |  |  |  |  |  |
| Content of α-olefin | % by mol | 17 | 17 | 17 | 19 |
| Intrinsic viscosity (η) | dl/g | 2.2 | 2.2 | 1.9 | 2.2 |
| Glass transition temperature (Tg) | ° C. | −60 | −60 | −60 | −65 |
| Crystallinity | % | 2 | 2 | 2 | 2 |
| Mw/Mn | — | 2.5 | 2.5 | 2.5 | — |
| B value | — | 1.1 | 1.1 | 1.0 | 1.1 |
| gη* value | — | 1.0 | 1.0 | 0.86 | — |
| Graft-modified product |  |  |  |  |  |
| Charge of quantity of MAH | % by wt. | 0.5 | 0.5 | 0.5 | 0.5 |
| Graft quantity of MAH | % by wt. | 0.48 | 0.48 | 0.50 | 0.43 |
| Components of polyamide resin composition |  |  |  |  |  |
| Nylon-6 | parts by weight | 100 | 100 | 100 | 100 |
| Modified ethylene/α-olefin copolymer | parts by weight | 25 | 100 | 25 | 25 |
| Properties of polyamide resin composi- | kg/cm² | 19400 | 6500 | 19200 | 18600 |

TABLE 1-continued

|  | Unit | Ex. 1 | Ex. 2 | Ex. 3 | Comp. Ex. 1 |
|---|---|---|---|---|---|
| tion molded product FM |  |  |  |  |  |
| Notched Izod impact strength |  |  |  |  |  |
| 23° C. | kg · cm/cm | N.B. | N.B. | N.B. | — |
| −20° C. | kg · cm/cm | N.B. | N.B. | N.B. | — |
| −40° C. | kg · cm/cm | 20 | N.B. | 18 | 16 |

Remarks:
MAH: maleic anhydride
N.B.: non-breakable

The α-olefin for constituting the ethylene/α-olefin copolymer is 1-octene in each of Examples 1 to 3, and it is 1-butene in Comparative Example 1.

What is claimed is:

1. A polyamide resin composition comprising:

(I) 100 parts by weight of a polyamide resin (A), and (II) 25 to 100 parts by weight of a graft-modified ethylene/α-olefin random copolymer (B) being obtained by graft-modifying an ethylene/α-olefin random copolymer, obtained by random copolymerizing ethylene and an α-olefin of 6 to 20 carbon atoms in the presence of a metallocene catalyst, with an unsaturated carboxylic acid or its derivative and having a graft quantity of 0.01 to 10% by weight, wherein the graft-modified ethylene/α-olefin random copolymer (B) is a graft-modified product of an ethylene/α-olefin random copolymer having the following properties:

(a) the content of the α-olefin of 6 to 20 carbon atoms is in the range of 6 to 25% by mol; and (b) the intrinsic viscosity (η), as measured in decalin at 135° C., is in the range of 0.5 to 5.0 dl/g, and wherein the ethylene/α-olefin random copolymer before the graft modification is an ethylene/α-olefin random copolymer having a (d) crystallinity as measured by X-ray diffractometry of less than 30%.

2. The polyamide resin composition as claimed in claim 1, wherein the ethylene/α-olefin random copolymer before the graft modification is a linear ethylene/α-olefin random copolymer having the following properties:

(a) the α-olefin contains from 6 to 10 carbon atoms;

(b) the glass transition temperature (Tg) is not higher than −50° C.;

(c) the molecular weight distribution (Mw/Mn), as determined by GPC, is not more than 3.0;

(d) the B value, as determined by the $^{13}$C-NMR spectrum and the following equation, is in the range of 1.0 to 1.4, $$B = P_{OE}/(2P_O \cdot P_E)$$

wherein $P_E$ and $P_O$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences; and (e) the ratio gη* of the intrinsic viscosity (1) determined in the property (b) to the intrinsic viscosity $(\eta)_{blank}$ of a linear ethylene/propylene copolymer having the same weight-average molecular weight (measured by a light scattering method) as said ethylene/α-olefin random copolymer and having an ethylene content of 70% by mol, $(\eta)/(\eta)_{blank}$, is more than 0.95.

3. The polyamide resin composition as claimed in claim 2, wherein the linear ethylene/α-olefin random copolymer is an ethylene/1-olefin random copolymer obtained by random copolymerizing ethylene and an α-olefin of 6 to 20 carbon atoms in the presence of a metallocene catalyst containing a metallocene compound represented by the following formula [C-a] or [B-a]:

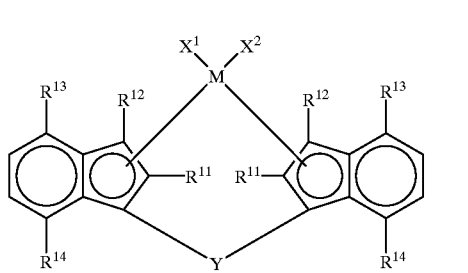

[C-a]

wherein M is a transition metal of Group IVB of the periodic table, $R^{11}$ and $R^{12}$ are each hydrogen, a halogen atom, a hydrocarbon group of 1 to 20 carbon atoms optionally substituted with halogen, a silicon-containing group, an oxygen-containing group, a sulfur-containing group, a nitrogen-containing group or a phosphorus-containing group, $R^{13}$ and $R^{14}$ are each an alkyl group of 1 to 20 carbon atoms, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O) (R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms);

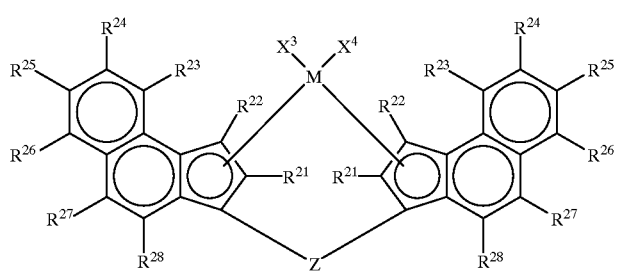

wherein M is a transition metal of Group IVB of the periodic table, $R^{21}$s may be the same as or different from each other and are each hydrogen, a halogen atom, an alkyl group of 1 to 10 carbon atoms which is optionally halogenated, an aryl group of 6 to 10 carbon atoms, —NR$_2$, —SR, —OSiR$_3$, —SiR$_3$ or —PR$_2$ (R is a halogen atom, an alkyl group of 1 to 10 carbon atoms or an aryl group of 6 to 10 carbon atoms), $R^{22}$ to $R^{28}$ are each the same as $R^{21}$, or adjacent two of $R^{22}$ to $R^{28}$ may form an aromatic or aliphatic ring together with carbon atoms to which they are bonded, $X^3$ and $X^4$ may be the same as or different from each other and are each hydrogen, a halogen atom, an OH group, an alkyl group of 1 to 10 carbon atoms, an alkoxy group of 1 to 10 carbon atoms, an aryl group of 6 to 10 carbon atoms, an aryloxy group of 6 to 10 carbon atoms, an alkenyl group of 2 to 10 carbon atoms, an arylalkyl group of 7 to 40 carbon atoms, an alkylaryl group of 7 to 40 carbon atoms or an arylalkenyl group of 8 to 40 carbon atoms, and Z is

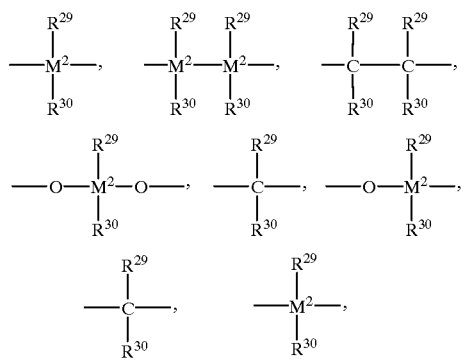

=BR$^{29}$, =AlR$^{29}$, —G—, —Sn—, —O—, —S—, =SO, =SO$_2$, =NR$^{29}$, =CO, =PR$^{29}$ or =P(O)R$^{29}$ (R$^{29}$ and R$^{30}$ may be the same as or different from each other and are each hydrogen, a halogen atom, an alkyl group of 1 to 10 carbon atom, a fluoroalkyl group of 1 to 10 carbon atoms, an aryl group of 6 to 10 carbon atoms, a fluoroaryl group of 6 to 10 carbon atoms, an alkoxy group of 1 to 10 carbon atoms, an alkenyl group of 2 to 10 carbon atoms, an arylalkyl group of 7 to 40 carbon atoms, an arylalkenyl group of 8 to 40 carbon atoms or an alkylaryl group of 7 to 40 carbon atoms, or R$^{29}$ and R$^{30}$ may form a ring together with atoms to which they are bonded, and M$^2$ is silicon, germanium or tin).

[B-a]

4. The polyamide resin composition as claimed in claim 1, wherein the ethylene/α-olefin random copolymer before the graft modification is a long-chain branched ethylene/α-olefin random copolymer having the following properties:

(a) the α-olefin contains from 6 to 10 carbon atoms;

(b) the glass transition temperature (Tg) is not higher than −50° C.;

(c) the molecular weight distribution (Mw/Mn), as determined by GPC, is not more than 3.0;

(d) the B value, as determined by the $^{13}$C-NMR spectrum and the following equation, is in the range of 1.0 to 1.4, $$B=P_{OE}/(2P_O \cdot P_E)$$

wherein $P_E$ and $P_O$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences; and (e) the ratio gη* of the intrinsic viscosity (η) determined in the property (b) to the intrinsic viscosity $(\eta)_{blank}$ of a linear ethylene/propylene copolymer having the same weight-average molecular weight (measured by a light scattering method) as said ethylene/α-olefin random copolymer and having an ethylene content of 70% by mol, $(\eta)/(\eta)_{blank}$, is in the range of 0.2 to 0.95.

5. The polyamide resin composition as claimed in claim 4, wherein the long-chain branched ethylene/α-olefin random copolymer is an ethylene/α-olefin random copolymer obtained by random copolymerizing ethylene and an α-olefin of 6 to 20 carbon atoms in the presence of a metallocene catalyst containing a metallocene compound represented by the following formula [II]:

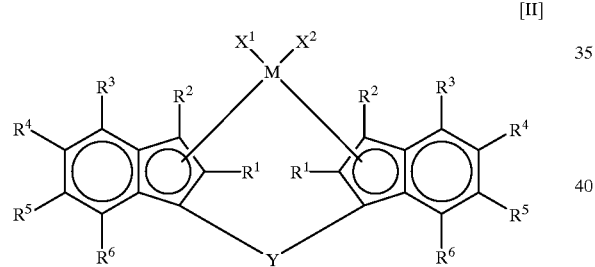

wherein M is a transition metal of Group IVB of the periodic table, $R^1$ is a hydrocarbon group of 1 to 6 carbon atoms, $R^2$, $R^4$, $R^5$ and $R^6$ may be the same as or different from each other and are each hydrogen, a halogen atom or a hydrocarbon group of 1 to 6 carbon atoms, $R^3$ is an aryl group of 6 to 16 carbon atoms, optionally substituted with halogen atom, a hydrocarbon group of 1 to 20 carbon atoms or an organosilyl group, $X^1$ and $X^2$ are each hydrogen, a halogen atom, a hydrocarbon group of 1 to 20 carbon atoms, a halogenated hydrocarbon group of 1 to 20 carbon atoms, an oxygen-containing group or a sulfur-containing group, and Y is a divalent hydrocarbon group of 1 to 20 carbon atoms, a divalent halogenated hydrocarbon group of 1 to 20 carbon atoms, a divalent silicon-containing group, a divalent germanium-containing group, —O—, —CO—, —S—, —SO—, —SO$_2$—, —NR$^7$—, —P(R$^7$)—, —P(O) (R$^7$)—, —BR$^7$— or —AlR$^7$— (R$^7$ is hydrogen, a halogen atom, a hydrocarbon group of 1 to 20 carbon atoms or a halogenated hydrocarbon group of 1 to 20 carbon atoms).

6. A polyamide resin composition comprising:

(I) 100 parts by weight of a polyamide resin (A), and (II) 25 to 60 parts by weight of a graft-modified ethylene/α-olefin random copolymer (B) obtained by graft-modifying an ethylene/α-olefin random copolymer, obtained by random copolymerizing ethylene and an α-olefin of 6 to 10 carbon atoms in the presence of a metallocene catalyst, with an unsaturated carboxylic acid or its derivative and having a graft quantity of 0.1 to 5% by weight, wherein the graft-modified ethylene/α-olefin random copolymer (B) is a graft-modified product of an ethylene/α-olefin random copolymer having the following properties:

(a) the content of the α-olefin of 6 to 10 carbon atoms is in the range of 6 to 25% by mol;

(b) the intrinsic viscosity (η), as measured in decalin at 135° C., is in the range of 0.5 to 5.0 dl/g, and wherein the ethylene/α-olefin random copolymer before the graft modification is an ethylene/α-olefin random copolymer having the following properties:

(a) the content of the α-olefin of 6 to 10 carbon atoms is in the range of 6 to 25% mol;

(b) the intrinsic viscosity (η), as measured in decalin at 135° C., is in the range of 0.5 to 5.0 dl/g;

(c) the glass transition temperature (Tg) is not higher than −50° C.;

(d) the crystallinity, as measured by X-ray diffractometry, is less than 30%;

(e) the molecular weight distribution (Mw/Mn), as determined by GPC, is not more than 3.0; and (f) the B value, as determined by the $^{13}$C-NMR spectrum and the following equation, is in the range of 1.0 to 1.4, $$B=P_{OE}/(2P_0 \cdot P_E)$$

wherein $P_E$ and $P_0$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences.

7. The polyamide resin composition as claimed in claim 6, wherein the ethylene/α-olefin random copolymer is a linear ethylene/α-olefin random copolymer obtained by random copolymerizing ethylene and an α-olefin of 6 to 10 carbon atoms in the presence of a metallocene catalyst containing a metallocene compound represented by the above claim 4 formula (C-a) or (B-a) and the ratio gη* of the intrinsic viscosity (η) measured in decalin at 135° C. determined before the graft modification to the intrinsic viscosity $(\eta)_{blank}$ of a linear ethylene/propylene copolymer having the same weight-average molecular weight measured by a light scattering method, as said ethylene/α-olefin random copolymer and having an ethylene content of 70% by mol, $(\eta)/(\eta)_{blank}$, is more than 0.95.

8. The polyamide resin composition as claimed in claim 7, wherein the metallocene catalyst comprises bis(1,3-dimethylcyclopentadienyl)-zirconium dichloride.

9. The polyamide resin composition as claimed in claim 6, wherein the ethylene/α-olefin random copolymer is a long chain branched ethylene/α-olefin random copolymer obtained by random copolymerizing ethylene and an α-olefin of 6 to 20 carbon atoms in the presence of a metallocene catalyst containing a metallocene compound represented by the above claim 6 formula (II) and the ratio gη* of the intrinsic viscosity (η) measured in decalin at 135° C. determined before the graft modification to the intrinsic viscosity (η)$_{blank}$ of a linear ethylene/propylene copolymer having the same weight-average molecular weight (measured by a light scattering method) as said ethylene/α-olefin random copolymer and having an ethylene content of 70% by mol, (η)/(η)$_{blank}$, is in the range of 0.2 to 0.95.

10. The polyamide resin composition as claimed in claim 9, wherein the metallocene catalyst comprises rac-dimethylsilylene-bis(1-(2-methyl-4-phenylindenyl)) zirconium dichloride.

11. A polyamide resin composition comprising:

(I) 100 parts by weight of a polyamide resin (A) obtained by polymerizing an alkyl diamine having 2 to 13 carbon atoms and an aliphatic dicarboxylic acid having 4 to 12 carbon atoms, and (II) 25 to 60 parts by weight of a graft-modified ethylene/α-olefin random copolymer (B) obtained by graft-modifying an ethylene/α-olefin random copolymer, obtained by random copolymerizing ethylene and an aliphatic α-olefin of 6 to 10 carbon atoms in the presence of a metallocene catalyst, with an unsaturated carboxylic acid or its derivative and having a graft quantity of 0.1 to 5% by weight, wherein the graft-modified ethylene/α-olefin random copolymer (B) is a graft-modified product of an ethylene/α-olefin random copolymer having the following properties:

(a) the content of the α-olefin of 8 to 10 carbon atoms is in the range of 6 to 25% by mol;

(b) the intrinsic viscosity (η), as measured in decalin at 135° C., is in the range of 0.5 to 5.0 dl/g, and wherein the ethylene/α-olefin random copolymer before the graft modification is an ethylene/α-olefin random copolymer having the following properties:

(a) the content of the α-olefin of 8 to 10 carbon atoms is in the range of 6 to 25% by mol;

(b) the intrinsic viscosity (η), as measured in decalin at 135° C., is in the range of 0.5 to 5.0 dl/g;

(c) the glass transition temperature (Tg) is not higher than −50° C.;

(d) the crystallinity, as measured by X-ray diffractometry, is less than 20%;

(e) the molecular weight distribution (Mw/Mn), as determined by GPC, is not more than 3.0; and (f) the B value, as determined by the $^{13}$C-NMR spectrum and the following equation, is in the range of 1.0 to 1.4, $$B=P_{OE}/(2P_O \cdot P_E)$$

wherein $P_E$ and $P_O$ are a molar fraction of the ethylene component and a molar fraction of the α-olefin component, respectively, contained in the unmodified ethylene/α-olefin random copolymer, and $P_{OE}$ is a proportion of the number of the ethylene/α-olefin alternating sequences to the number of all the dyad sequences.

12. The polyamide resin composition as claimed in claim 11, wherein the ethylene/α-olefin random copolymer before the graft modification is an ethylene/α-olefin random copolymer having a crystallinity, as measured by X-ray diffractometry, of 2% or less.

13. The polyamide resin composition as claimed in claim 1, wherein the α-olefin in the ethylene/α-olefin random copolymer (B) contains 6 to 10 carbon atoms.

14. The polyamide resin composition as claimed in claim 6, wherein the α-olefin in the ethylene/α-olefin random copolymer (B) contains 8 to 10 carbon atoms.

15. The polyamide resin composition as claimed in claim 11, wherein the α-olefin in the ethylene/α-olefin random copolymer (B) contains 8 to 10 carbon atoms.

16. The polyamide resin composition as claimed in claim 11, wherein the α-olefin in the ethylene/α-olefin random copolymer is 1-octene and the metallocene catalyst comprises bis(1,3-dimethylcyclopentadienyl)-zirconium dichloride.

17. The polyamide resin composition of claim 11, wherein the α-olefin the ethylene/α-olefin random copolymer is 1-octene and the metallocene catalyst comprises rac-dimethylsilylene-bis(1-(2-methyl-4-phenylindenyl)) zirconium dichloride.

* * * * *